United States Patent
Oh et al.

(10) Patent No.: US 12,004,213 B2
(45) Date of Patent: Jun. 4, 2024

(54) METHOD AND APPARATUS FOR ADJUSTING CONTENTION WINDOW IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR);
Jeongho Yeo, Gyeonggi-do (KR);
Hyunseok Ryu, Gyeonggi-do (KR);
Sungjin Park, Gyeonggi-do (KR);
Jonghyun Bang, Gyeonggi-do (KR);
Cheolkyu Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/799,309

(22) Filed: Feb. 24, 2020

(65) Prior Publication Data
US 2020/0275482 A1    Aug. 27, 2020

(30) Foreign Application Priority Data

Feb. 22, 2019    (KR) .................. 10-2019-0021429

(51) Int. Cl.
*H04W 74/08*    (2024.01)
*H04W 72/0453*    (2023.01)

(52) U.S. Cl.
CPC ....... *H04W 74/08* (2013.01); *H04W 72/0453* (2013.01)

(58) Field of Classification Search
CPC ...... H04L 47/27; H04L 5/0055; H04W 16/14; H04W 74/08; H04W 74/0816;
(Continued)

(56) References Cited

U.S. PATENT DOCUMENTS

2017/0171883 A1\* 6/2017 Noh .................. H04L 1/1812
2017/0188387 A1\* 6/2017 Mukherjee ........... H04L 5/0055
(Continued)

FOREIGN PATENT DOCUMENTS

| EP | 3 370 359 | 9/2018 |
|----|-----------|--------|
| EP | 3 432 675 | 1/2019 |

(Continued)

OTHER PUBLICATIONS

Zte, Sanechips, "Discussion on Channel Access Procedure for NR-U", R1-1901609, 3GPP TSG RAN WG1 Meeting #96, Feb. 25-Mar. 1, 2019, 8 pages.
(Continued)

*Primary Examiner* — Quoc Thai N Vu
(74) *Attorney, Agent, or Firm* — The Farrell Law Firm, P.C.

(57) ABSTRACT

The disclosure relates to a communication method and system for converging a 5G communication system for supporting higher data rates beyond a 4G system with a technology for IoT. The disclosure may be applied to intelligent services based on the 5G communication technology and the IoT-related technology, such as smart home, smart building, smart city, smart car, connected car, health care, digital education, smart retail, security and safety services. A method of operating a BS includes monitoring a channel for a plurality of subbands, based on a first contention window configured in each of the plurality of subbands; transmitting a downlink signal to a terminal, based on a result of the monitoring; obtaining, from the terminal, a transmission result of the downlink signal for a reference duration; and determining a second contention window for monitoring a next channel for the plurality of subbands, based on the obtained transmission result.

20 Claims, 18 Drawing Sheets

(58) Field of Classification Search
CPC ......... H04W 72/0453; H04W 74/0808; H04W 74/0833; H04W 74/002; H04W 72/1263; H04W 72/1278
See application file for complete search history.

(56) References Cited

U.S. PATENT DOCUMENTS

| | | | |
|---|---|---|---|
| 2018/0310340 A1 | 10/2018 | Noh et al. | |
| 2019/0007972 A1 | 1/2019 | Gou et al. | |
| 2019/0246412 A1* | 8/2019 | Noh | H04W 74/0808 |
| 2020/0259599 A1* | 8/2020 | Zhang | H04W 72/1268 |
| 2020/0374236 A1* | 11/2020 | Li | H04L 1/1893 |
| 2020/0374940 A1* | 11/2020 | Jia | H04L 5/00 |
| 2021/0307068 A1* | 9/2021 | Kim | H04B 7/0695 |
| 2021/0329693 A1* | 10/2021 | Nogami | H04W 72/0453 |
| 2021/0385831 A1* | 12/2021 | Nogami | H04L 5/0094 |

FOREIGN PATENT DOCUMENTS

| | | |
|---|---|---|
| WO | WO 2018/021783 | 2/2018 |
| WO | WO 2020/067687 | 4/2020 |
| WO | WO 2020/091080 | 5/2020 |
| WO | WO 2020/168039 | 8/2020 |

OTHER PUBLICATIONS

LG Electronics, "Channel Access Procedure for NR-U", R1-1902040, 3GPP TSG RAN WG1 Meeting #96, Feb. 25-Mar. 1, 2019, 14 pages.
Nokia, Nokia Shanghai Bell, "Channel Access and Co-existence for NR-U Operation", R1-1902109, 3GPP TSG RAN WG1 Meeting #96, Feb. 25-Mar. 1, 2019, 10 pages.
Qualcomm Incorporated, "Channel Access Procedures for NR Unlicensed", R1-1902985, 3GPP TSG RAN WG1 Meeting #96, Feb. 25-Mar. 1, 2019, 15 pages.
International Search Report dated Jun. 4, 2020 issued in counterpart application No. PCT/KR2020/002595, 3 pages.
Samsung, "Channel Access Procedures for NR-U", R1-1902257, 3GPP TSG-RAN wG1 Meeting #96, Feb. 25-Mar. 1, 2019, 10 pages.
European Search Report dated Mar. 14, 2022 issued in counterpart application No. 20760198.0-1215, 11 pages.
Indian Examination Report dated May 15, 2023 issued in counterpart application No. 202137037763, 6 pages.
European Search Report dated Apr. 5, 2024 issued in counterpart application No. 20760198.0-1215, 11 pages.

* cited by examiner

METHOD AND APPARATUS FOR ADJUSTING CONTENTION WINDOW IN WIRELESS COMMUNICATION SYSTEM

CROSS-REFERENCE TO RELATED APPLICATION(S)

This application is based on and claims priority under 35 U.S.C. § 119 to Korean Patent Application No. 10-2019-0021429, filed on Feb. 22, 2019, in the Korean Intellectual Property Office, the entire disclosure of which is incorporated herein by reference.

BACKGROUND

1. Field

The disclosure relates generally to a wireless communication system, and more particularly, to a contention window adaptation method and apparatus for performing a channel access procedure in a wireless communication system.

2. Description of Related Art

To meet the increasing demand for wireless data traffic since deployment of 4th generation (4G) communication systems, efforts have been made to develop an improved 5th generation (5G) or pre-5G communication system. The 5G or pre-5G communication system may also be referred to as a "Beyond 4G Network" or a "Post long term evolution (LTE) System".

The 5G communication system will provide higher frequency (e.g., millimeter-wave (mmWave)) bands, e.g., 60 GHz bands, in order to accomplish higher data rates. To decrease propagation loss of the radio waves and increase the transmission distance, beamforming, massive multiple-input multiple-output (MIMO), full dimensional MIMO (FD-MIMO), array antennas, analog beam forming, and large scale antenna techniques are being discussed for use in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc. In the 5G system, hybrid frequency shift keying (FSK) and quadrature amplitude modulation (FQAM) and sliding window superposition coding (SWSC) have been developed for advanced coding modulation (ACM), and filter bank multi carrier (FBMC), non-orthogonal multiple access (NOMA), and sparse code multiple access (SCMA) have been developed as advanced access technologies.

The Internet is now evolving to the Internet of things (IoT) in which distributed entities, i.e., things, exchange and process information without human intervention. The Internet of everything (IoE), which is a combination of the IoT technology and big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), etc., have been recently researched. Such an IoT environment may provide intelligent Internet technology services by collecting and analyzing data generated among connected things. IoT may be applied to a variety of fields including smart homes, smart buildings, smart cities, smart cars, connected cars, smart grids, health care, smart appliances, and advanced medical services through convergence and combination between existing information technology (IT) and various industrial applications.

In view of the foregoing, various attempts have been made to apply 5G communication systems to IoT networks. For example, technologies such as a sensor network, MTC, and M2M communication may be implemented by beamforming, MIMO, and array antennas.

Application of a cloud RAN as the above-described big data processing technology may also be considered an example of the convergence of 5G technology and IoT technology.

Since various services can be provided with the advancement of wireless communication systems as described above, schemes for efficiently providing these services are needed.

SUMMARY

An aspect of the disclosure is to provide an apparatus and a method for channel access in a wireless communication system.

Another aspect of the disclosure is to provide an apparatus and a method for performing a channel access procedure in an unlicensed band.

Another aspect of the disclosure is to provide an apparatus and a method for adjusting a contention window to perform a channel access procedure in an unlicensed band.

In accordance with an aspect of the disclosure, a method is provided for a base station (BS) in a wireless communication system. The method includes monitoring a channel for a plurality of subbands, based on a first contention window configured in each of the plurality of subbands; transmitting a downlink signal to a terminal, based on a result of the monitoring; obtaining, from the terminal, a transmission result of the downlink signal for a reference duration; and determining a second contention window for monitoring a next channel for the plurality of subbands, based on the obtained transmission result.

In accordance with another aspect of the disclosure, a method is provided for a terminal in a wireless communication system. The method includes receiving a downlink signal from a base station (BS), based on a channel monitored using a first contention window configured for each of a plurality of subbands; and transmitting, to the BS, a reception result of the downlink signal for a reference duration. A second contention window for monitoring a next channel for the plurality of subbands is determined by the BS, based on the reception result.

In accordance with another aspect of the disclosure, a BS is provided, which includes a transceiver; and a controller configured to monitor a channel for a plurality of subbands, based on a first contention window configured in each of the plurality of subbands, transmit, via the transceiver, a downlink signal to a terminal, based on a result of the monitoring, obtain, via the transceiver, from the terminal, a transmission result of the downlink signal for a reference duration, and determine a second contention window for monitoring a next channel for the plurality of subbands, based on the obtained transmission result.

In accordance with another aspect of the disclosure, a terminal is provided, which includes a transceiver; and a controller configured to receive, via the transceiver, a downlink signal from a base station (BS), based on a channel monitored based on a first contention window configured for each of a plurality of subbands, and transmit, to the BS, via the transceiver, a reception result of the downlink signal for a reference duration. A second contention window for monitoring a next channel for the plurality of subbands is determined by the BS, based on the reception result.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
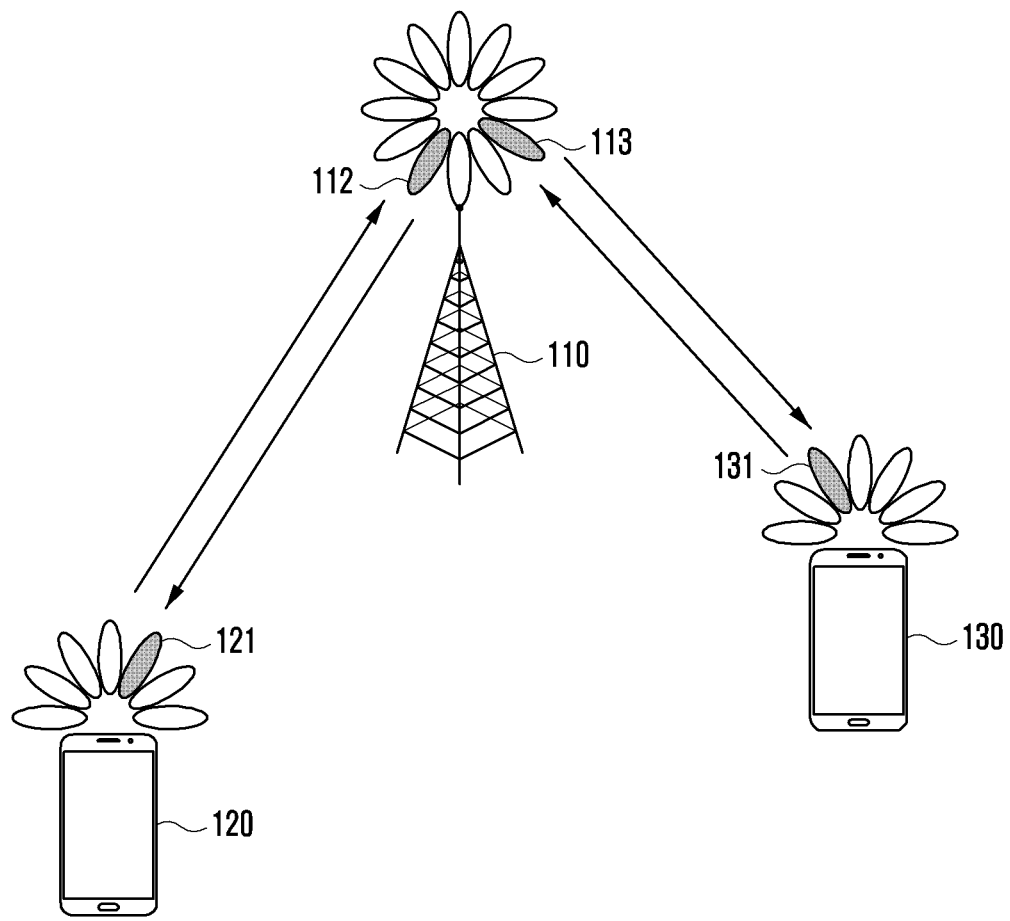
FIG. 1 illustrates a wireless communication system according to an embodiment.

Hereinafter, various embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Throughout the specification, the same or like reference numerals designate the same or like elements.

In the accompanying drawings, some elements may be exaggerated, omitted, or schematically illustrated. Further, the size of each element does not completely reflect the actual size.

Each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

Herein, the term "unit" may refer to a software element or a hardware element, such as a Field Programmable Gate Array (FPGA) or an Application Specific Integrated Circuit (ASIC), which performs a predetermined function. However, the term "unit" does not always have a meaning limited to software or hardware. A "unit" may be constructed either to be stored in an addressable storage medium or to execute one or more processors. Therefore, a "unit" may include software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" may be either combined into a smaller number of elements, or units, or divided into a larger number of elements, or units. Moreover, the elements and units or may be implemented to reproduce one or more central processing units (CPUs) within a device or a security multimedia card. Further, a "unit" may include one or more processors.

A 5G system has been developed to provide resources for a wider variety of services than those supported by a conventional 4G system. For example, services supported by the 5G system may include a ultra-wide band mobile communication service (enhanced mobile broad band (eMBB)), a ultra-reliable and low latency communication service (ultra-reliable and low latency communication (URLLC)), a massive device-to-device communication service (massive machine-type communication (mMTC)), and a next-generation broadcast service (evolved multimedia broadcast/multicast service (eMBMS)). The above-described 5G system services are only examples, and the available services of the 5G system are not limited thereto.

A system that provides the URLLC service may be referred to as an URLLC system, and a system that provides the eMBB service may be referred to as an eMBB system. The terms "service" and "system" may be interchangeably used with each other.

As described above, a plurality of services may be provided to a user in a communication system. In order to provide a plurality of services to a user, a method of providing the services within the same time interval according to the characteristics thereof and an apparatus using the same are needed.

A BS may transmit downlink control information (DCI) including resource allocation information for transmitting a downlink signal to a terminal through a downlink control channel (physical downlink control channel (PDCCH)) in a wireless communication system such as an LTE or LTE-advanced (LTE-A) system or a 5G new radio (NR) system. The terminal may be configured to receive at least one downlink signal among DCI (for example, a channel-state information reference signal (CSI-RS), a broadcast channel (physical broadcast channel (PBCH), or a downlink data channel (physical downlink shared channel (PDSCH)).

For example, the BS may transmit DCI indicating reception of a PDSCH in slot n to the terminal through a PDCCH in slot n, and the terminal receiving the DCI may receive the PDSCH in slot n according to the received downlink control information.

In the LTE, LTE-A, or NR system, the BS may transmit DCI including uplink resource allocation information to the terminal through the PDCCH, and the terminal may transmit, to the BS, at least one uplink signal among uplink control information (UCI), such as a sounding reference signal (SRS) or a physical random access channel (PRACH)), or an uplink data channel such as a physical uplink shared channel (PUSCH).

For example, the terminal receiving configuration information for uplink transmission (e.g., DCI or a UL grant including resource allocation information for uplink transmission) transmitted through the PDCCH from the BS in slot n may perform uplink data channel transmission (hereinafter, referred to as PUSCH transmission) at a time defined in advance (e.g., n+4), at a time configured through a higher-layer signal (e.g., n+k), or according to uplink signal transmission time indicator information (e.g., n+k) included in the configuration information for uplink transmission.

If the configured downlink transmission is performed from the BS to the terminal through an unlicensed band or the configured uplink transmission is performed from the terminal to the BS through an unlicensed band, a communication device (e.g., the BS or the terminal) may perform a channel access procedure, such as listen-before-talk (LBT), for the unlicensed band in which the signal transmission is configured before or immediately before a time at which the configured signal transmission starts. If it is determined that the unlicensed band is in an idle state based on a result of the channel access procedure, the communication device access the unlicensed band and perform the configured signal transmission. If it is determined that the unlicensed band is not in the idle state or is in an occupied state according to the channel access procedure performed by the communication device, the communication device cannot access the unlicensed band and thus cannot perform the configured signal transmission.

Hereinafter, the channel access procedure may the terminal or the BS identifying whether a channel of the unlicensed band is in the idle state or is occupied. In the channel access procedure in the unlicensed band in which signal transmission is configured, the communication device may receive a signal in the unlicensed band for a predetermined time or a time calculated according to a predefined rule (e.g., a time calculated through one random value selected at least by the BS or the terminal) and compare the strength of the received signal with a predefined threshold value or a threshold value calculated according to a function expressed by at least one parameter such as a channel bandwidth, a signal bandwidth in which a signal to be transmitted is transmitted, the strength of transmission power, and a beam width of a transmitted signal, in order to determine an idle state of the unlicensed band.

For example, if the strength of a signal received by the communication device during 25 us in the unlicensed band is smaller than a predefined threshold value of −72 dBm, the communication device may determine that the unlicensed band is in the idle state and perform configured signal transmission in the unlicensed band. The maximum time during which the signal can be transmitted may be limited according to a maximum COT (MCOT) defined for each country or each region in the unlicensed band or the type of the communication device. For example, in Japan, after performing a channel access procedure in an unlicensed band of 5 GHz and occupying a channel in the idle state, the BS or the terminal may occupy the channel for a maximum of 4 ms without additional channel access procedure and transmit a signal. If the strength of the received signal during 25 us is larger than the predefined threshold value of −72 dBm, the communication device may determine that the unlicensed band is not in the idle state and may not transmit a signal.

In the 5G communication system, in order to provide various services and support a high data transmission rate, various technologies for performing re-transmission in units of CBGs and transmitting an uplink signal without uplink scheduling information (e.g., grant-free uplink transmission) will be introduced. Accordingly, when 5G communication is performed through the unlicensed band, a more efficient channel access procedure that considers various parameters is needed.

A wireless communication system has developed into a broadband wireless communication system that provides high-speed and high-quality packet data service like communication standards such as high-speed packet access (HSPA) of $3^{rd}$-generation partnership project (3GPP), LTE or evolved universal terrestrial radio access (E-UTRA), LTE-A, high-rate packet data (HRPD) of $3^{rd}$ generation partnership project 2 (3GPP2), ultra-mobile broadband (UMB), and 802.16e of Institute of Electrical and Electronics Engineers (IEEE), etc., beyond the initially provided voice-based service. Also, communication standards of 5G or NR are being developed as a $5^{th}$-generation wireless communication system.

As described above, wireless communication systems including $5^{th}$-generation systems may provide at least one service among eMBB, mMTC, and URLLC to the terminal. The above-described services may be provided to the same terminal during the same time interval. The eMBB may be a service for high-speed transmission of voluminous data, the mMTC may be a service for minimization of terminal power consumption and access by a plurality of terminals, and the URLLC may be a service for high reliability and low latency, but without limitation thereto. The three services may be main scenarios in an LTE system or a system, such as 5G or NR, subsequent to LTE, but are not limited thereto.

A BS is an entity that may allocates resources to a terminal, and may include at least one of a Node B, an evolved Node B (eNode B or eNB), a radio access unit, a BS controller, a node on a network, etc. The terminal may include a user equipment (UE), a mobile station (MS), a cellular phone, a smart phone, a computer, and a multimedia system capable of performing a communication function.

In the disclosure, a downlink refers to a wireless transmission path of a signal that the BS transmits to the terminal, and an uplink refers to a wireless transmission path of a signal that the terminal transmits to the BS.

Hereinafter, embodiments of the disclosure are described based on an LTE or LTE-A system, and the terms "physical channel" and "signal" in the conventional LTE or LTE-A system may be used to describe the method and apparatus proposed by the disclosure. However, embodiments of the disclosure may be applied to other communication systems having a technical background or channel form similar to the mobile communication system described in the disclosure. For example, other communication systems may include 5G or NR, developed after LTE-A.

Embodiments of the disclosure may be applied to other communication systems through some modifications without departing from the scope of the disclosure.

The NR system, which is a representative example of a broadband wireless communication system, employs an orthogonal frequency-division multiplexing (OFDM) scheme for a downlink, and employs both an OFDM scheme and a single carrier frequency division multiple access (SC-FDMA) scheme for an uplink. In the multiplexing scheme, time-frequency resources in which user data or control information is transmitted are allocated and operated such that the time-frequency resources do not overlap each other, in order to establish orthogonality, such that the user data or the control information may be distinguished.

If decoding fails at an initial transmission, the NR system employs hybrid automatic repeat request (HARQ) to retransmit the corresponding data in a physical layer. In the HARQ scheme, if a receiver does not accurately decode data, the receiver transmits a negative acknowledgement (NACK) informing the transmitter of decoding failure so that the transmitter may re-transmit the corresponding data on the physical layer. The receiver may improve data reception performance by combining the data retransmitted by the transmitter with data the decoding of which previously failed. However, if the receiver accurately decodes data, the receiver transmits an acknowledgement (ACK) indicating success in decoding to the transmitter, so that the transmitter may transmit new data.

According to an embodiment, a method and an apparatus are provided for allocating radio resources in an unlicensed band. More specifically, a method and an apparatus are provided for dividing a broadband frequency band into subbands, performing a channel access procedure for each subband, and, if it is determined that all or some of the subbands are in an idle state, based on a result of the channel access procedure, transmitting a downlink or uplink signal through the subbands determined to be in the idle state in a wireless communication system.

The BS or the terminal for transmitting a signal may transmit information on the subbands determined to be in the idle state, e.g., a result of the channel access procedure for each subband to the terminal or the BS through the channel access procedure in the broadband frequency band, and the terminal or the BS receiving the information may correctly receive a downlink or uplink signal on the basis of the result of the channel access procedure. The disclosure provides a method and an apparatus for, if a broadband frequency band, which is an unlicensed band, is divided into one subband, if the broadband frequency band is not divided into separate subbands, or without any distinction between a narrowband and a broadband, performing a channel access procedure for one frequency band and transmitting a downlink or uplink signal through a frequency band determined to be in an idle state, based on a result of the channel access procedure.

The terms referring to a signal used in the following description, the terms referring to a channel, the terms referring to control information, the terms referring to network entities, and the terms referring to elements of a device are used only for convenience of description. Accordingly, the disclosure is not limited to those terms, and other terms having the same technical meaning may be used.

Although various embodiments are described below using terminology commonly used in some communication standards (e.g., 3GPP), the embodiments of the disclosure may be modified and applied to other communication systems.

FIG. 1 illustrates a wireless communication system according to an embodiment.

Referring to FIG. 1, a BS 110, a terminal 120, and a terminal 130 are illustrated as nodes using a radio channel in a wireless communication system. Although FIG. 1 illustrates only one BS 110, additional BSs may also be included.

The BS 110 is a network infrastructure element that provides wireless access to the terminals 120 and 130. The BS 110 has coverage defined for a geographical region based on a distance at which a signal can be transmitted. The BS 110 may also be referred to as an access point (AP), an eNB, a gNodeB (gNB), a 5G node, a wireless point, a transmission/reception point (TRP), etc.

Each of the terminals 120 and 130 may be a device used by a user, and may perform communication with the BS 110 through a wireless channel. At least one of the terminals 120 and 130 may operate without user involvement. That is, at least one of the terminals 120 and 130 may be a device that performs MTC, and is not necessarily carried by the user. Each of the terminals 120 and 130 may also be referred to as a UE, a mobile station, a subscriber station, a remote terminal, a wireless terminal, a user device, etc.

The wireless communication environment of the BS 110 may include wireless communication in an unlicensed band. The BS 110, the terminal 120, and the terminal 130 may transmit and receive a wireless signal in an unlicensed band (e.g., 5 to 7 GHz and 64 to 71 GHz). In the unlicensed band, a cellular communication system and another communication system (e.g., a wireless local area network (WLAN)) may coexist. The BS 110, the terminal 120, and the terminal 130 may perform a channel access procedure for the unlicensed band in order to guarantee fairness between two communication systems. That is, the BS 110, the terminal 120, and the terminal 130 may perform a channel access procedure for the unlicensed band, such as LBT, in order to prevent a channel being exclusively used by only one system.

The BS 110, the terminal 120, and the terminal 130 may transmit and receive a wireless signal in mmWave bands (e.g., 28 GHz, 30 GHz, 38 GHz, and 60 GHz).

To increase a channel gain, the BS 110, the terminal 120, and the terminal 130 may perform beamforming. Beamforming may include transmission beamforming and reception beamforming. That is, the BS 110, the terminal 120, and the terminal 130 may assign directivity to a transmission signal and a reception signal.

The BS 110 and the terminals 120 and 130 may select serving beams through a beam search procedure or beam management procedure. After the serving beams are selected, communication may be performed through resources having a quasi-co-located relationship with resources through which the serving beams are transmitted.

Figure 2:
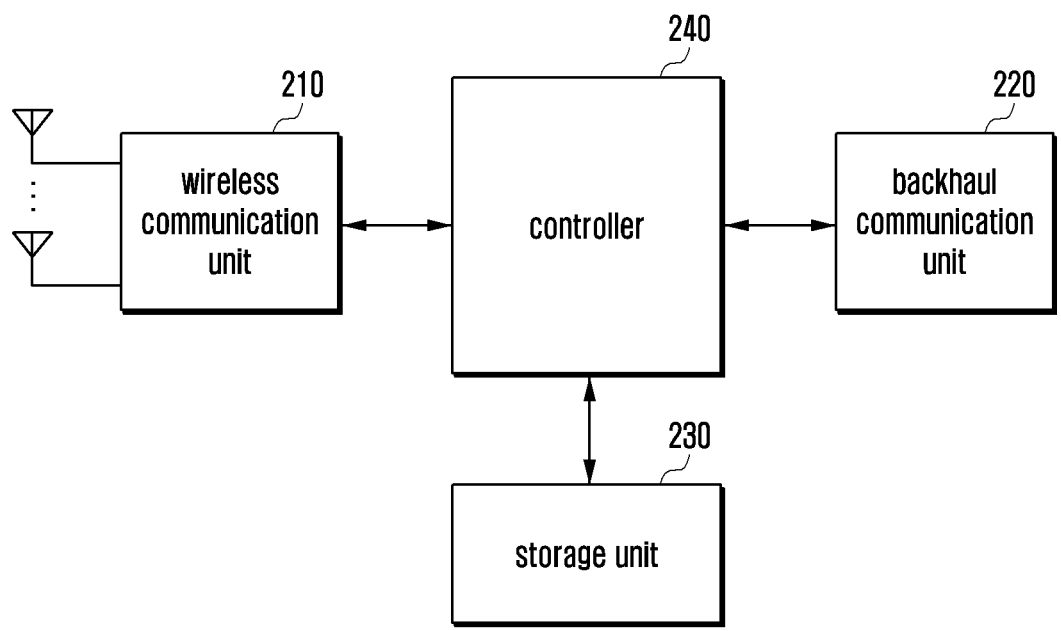
FIG. 2 illustrates a BS in a wireless communication system according to an embodiment.

FIG. 2 illustrates a BS in a wireless communication system according to an embodiment.

Referring to FIG. 2, the BS includes a wireless communication unit 210, a backhaul communication unit 220, a storage unit 230, and a controller 240.

The wireless communication unit 210 performs functions for transmitting and receiving signals through a wireless channel. The wireless communication unit 210 performs a function of conversion between a baseband signal and a bit stream according to a physical layer standard of the system. For data transmission, the wireless communication unit 210 generates complex symbols by encoding and modulating a transmission bit stream. For data reception, the wireless communication unit 210 restores a reception bit stream by demodulating and decoding a baseband signal.

The wireless communication unit 210 up-converts a baseband signal into a radio-frequency (RF) band signal and transmits the RF band signal through an antenna, and down-converts an RF band signal received through an antenna into a baseband signal. The wireless communication unit 210 may include a transmission filter, a reception filter, an amplifier, a mixer, an oscillator, a digital-to-analog convertor (DAC), an analog-to-digital convertor (ADC), etc. Further, the wireless communication unit 210 may include a plurality of transmission/reception paths and/or at least one antenna array consisting of a plurality of antenna elements.

On the hardware side, the wireless communication unit 210 may include a digital unit and an analog unit, and the analog unit may include a plurality of sub-units according to operation power, operation frequency, etc. The digital unit may be implemented by a processor (e.g., a digital signal processor (DSP)).

The wireless communication unit 210 transmits and receives the signal as described above. Accordingly, all or part of the wireless communication unit 210 may be referred to as a "transmitter", a "receiver", or a "transceiver". The wireless communication unit 210 may include at least one transceiver.

Also, the transmission and reception performed through a radio channel described below may be understood as the above-described processing being performed by the wireless communication unit 210.

The backhaul communication unit 220 provides an interface for performing communication with other nodes within the network. That is, the backhaul communication unit 220 converts a bit stream transmitted from the base station to another node, e.g., another access node, another base station, or a core network, into a physical signal, and converts a physical signal received from another node into a bit stream.

The storage unit 230 stores data, such as a basic program for operating the BS, an application, configuration information, etc. The storage unit 230 may be configured as volatile memory, nonvolatile memory, or a combination of volatile memory and nonvolatile memory. Further, the storage unit 230 provides stored data in response to a request from the controller 240. The storage unit 230 may include a memory.

The controller 240 controls the overall operation of the BS. For example, the controller 240 transmits and receives a signal through the wireless communication unit 210 or the backhaul communication unit 220. Further, the controller 240 records data in the storage unit 230 and reads the recorded data. The controller 240 may perform the functions of a required protocol stack according to communication standards. The protocol stack may be included in the wireless communication unit 210. The controller 240 may include at least one processor.

The controller 240 may control the BS to perform operations according to various embodiments described below. For example, the controller 240 may perform a channel access procedure for an unlicensed band. The wireless communication unit 210 may receive signals transmitted in an unlicensed band, and the controller 240 may compare the strength of the received signal with a threshold value determined according to a function value that is predefined or has a bandwidth as a factor, in order to determine whether the unlicensed band is in an idle state. Further, the controller 240 may transmit a control signal to the terminal or receive a control signal from the terminal through the wireless communication unit 210. The controller 240 may transmit data to the terminal or receive data from the terminal through the wireless communication unit 210. The controller 240 may determine the result of transmission of a signal transmitted to the terminal based on the control signal or data signal received from the terminal. The controller 240 may maintain or change a contention window value (hereinafter, referred to as "contention window adjustment") for the channel access procedure based on a transmission result, i.e., based on a result of reception of the control signal or the data signal by the terminal. The controller 240 may determine a reference slot in order to obtain the transmission result for contention window adjustment. The controller 240 may determine a data channel for contention window adjustment in the reference slot. The controller 240 may determine a reference control channel for contention window adjustment in the reference slot. If it is determined that the unlicensed band is in the idle state, the controller 240 may occupy the channel.

Figure 3:
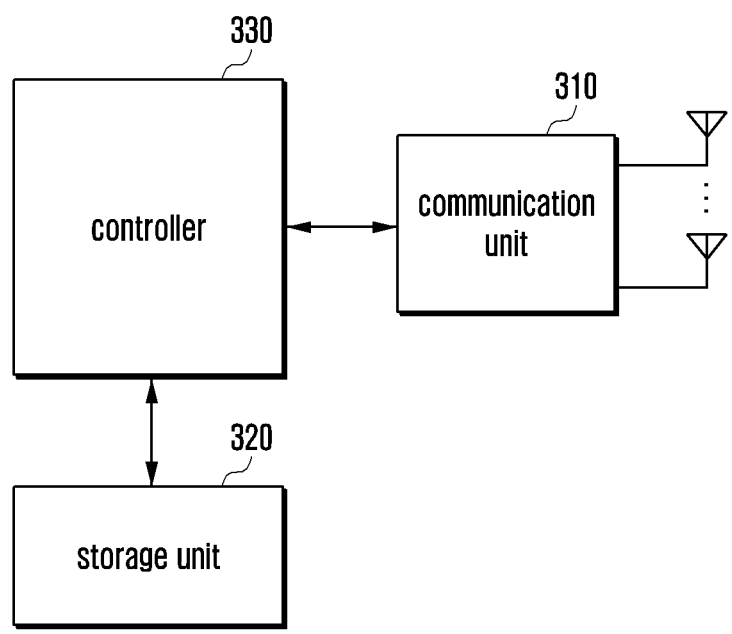
FIG. 3 illustrates a terminal in a wireless communication system according to an embodiment.

FIG. 3 illustrates a terminal in a wireless communication system according to an embodiment.

Referring to FIG. 3, the terminal includes a communication unit 310, a storage unit 320, and a controller 330.

The communication unit 310 performs functions for transmitting/receiving a signal through a wireless channel. For example, the communication unit 310 performs a function of conversion between a baseband signal and a bit stream according to a physical layer standard of the system. For data transmission, the communication unit 310 generates complex symbols by encoding and modulating a transmission bit stream. For data reception, the communication unit 310 restores a reception bit stream by demodulating and decoding a baseband signal. The communication unit 310 up-converts a baseband signal into a RF band signal and transmits the RF band signal through an antenna, and down-converts an RF band signal received through an antenna into a baseband signal. The communication unit 310 may include a transmission filter, a reception filter, an amplifier, a mixer, an oscillator, a DAC, an ADC, etc.

Further, the communication unit 310 may include a plurality of transmission/reception paths and/or at least one antenna array consisting of a plurality of antenna elements.

On the hardware side, the communication unit 310 may include a digital circuit and an analog circuit (e.g., an RF integrated circuit (RFIC)). The digital circuit and the analog circuit may be implemented as a single package. The communication unit 310 may include a plurality of RF chains. The communication unit 310 may perform beamforming.

The communication unit 310 transmits and receives the signal as described above. Accordingly, all or some of the communication unit 310 may be referred to as a "transmitter", a "receiver", or a "transceiver". The wireless communication unit 210 may include at least one transceiver.

Also, transmission and reception performed through a wireless channel, which is described below, may be understood as the above-described processing being performed by the communication unit 310.

The storage unit 320 may store data, such as a basic program for operating the terminal, an application, configuration information, etc. The storage unit 320 may be configured as volatile memory, nonvolatile memory, or a combination of volatile memory and nonvolatile memory. Further, the storage unit 320 provides stored data in response to a request from the controller 330. The storage unit 320 may include a memory.

The controller 330 controls the overall operation of the terminal. For example, the controller 330 transmits and receives a signal through the communication unit 310. Further, the controller 330 records data in the storage unit 320 and reads the recorded data. The controller 330 may perform the functions of a protocol stack required by the communication standard. The controller 330 may include at least one processor or microprocessor, and/or may play the part of the processor. The controller 330 may include at least one processor. Further, a part of the communication unit 310 and/or the controller 330 may be referred to as a communication processor.

The controller 330 may control the terminal to perform operations according to embodiments described below. For example, the controller 330 may receive, from the BS, a downlink control signal or downlink data through the communication unit 310. For example, the controller 330 may determine a result of transmission of the downlink signal. The transmission result may include feedback information such as an ACK, a NACK, or discontinuous transmission (DTX) of the transmitted downlink signal. The transmission result may also be referred to as a downlink signal reception state, a reception result, a decoding result, HARQ-ACK information, etc.

Further, the controller 330 may transmit an uplink signal to the BS through the communication unit 310, as a signal in response to the downlink signal. The uplink signal may explicitly or implicitly include the result of transmission of the downlink signal.

The controller 330 may perform a channel access procedure for an unlicensed band. For example, the communication unit 310 may receive signals transmitted in an unlicensed band, and the controller 330 may compare the strength of the received signal with a threshold value determined according to a function value, which is predefined or has a bandwidth as a factor, in order to determine whether the unlicensed band is in an idle state. The controller 330 may perform an access procedure for the unlicensed band in order to transmit a signal to the BS.

Figure 4:
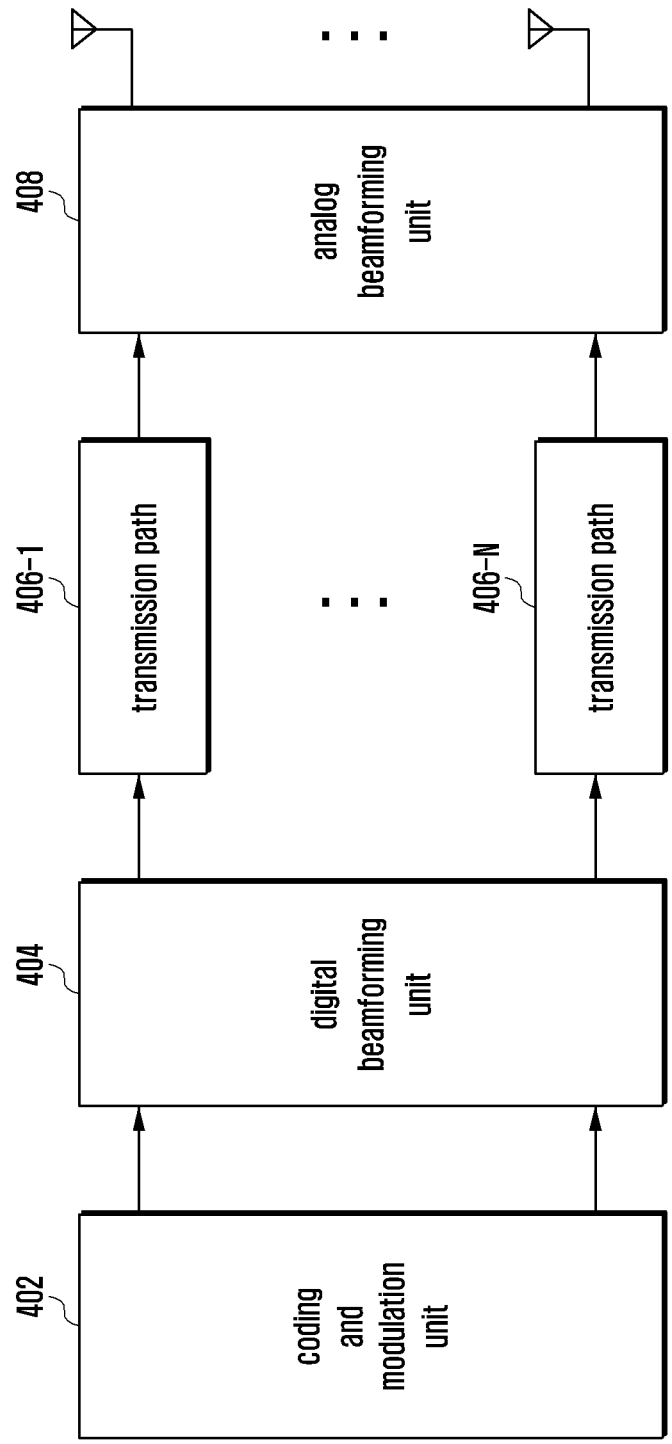
FIG. 4 illustrates a communication unit in a wireless communication system according to an embodiment.

FIG. 4 illustrates a communication unit in a wireless communication system according to an embodiment. Specifically, FIG. 4 illustrates an example of a communication unit that may be used as the wireless communication unit 210 of FIG. 2 or the communication unit 310 of FIG. 3.

Referring to FIG. 4, the communication unit includes a coding and modulation unit 402, a digital beamforming unit 404, a plurality of transmission paths 406-1 to 406-N, and an analog beamforming unit 408.

The encoding and modulation unit 402 performs channel encoding. For the channel encoding, at least one of a low-density parity check (LDPC) code, a convolutional code, and a polar code may be used. The coding and modulation unit 402 generates modulation symbols by performing constellation mapping.

The digital beamforming unit 404 performs beamforming for digital signals (e.g., modulation symbols). The digital beamforming unit 404 multiplies the modulation symbols by beamforming weight values. The beamforming weight values may be used for changing the size and phase of the signal, and may be referred to as a "precoding matrix" or a "precoder". The digital beamforming unit 404 outputs the digitally beamformed modulation symbols to the plurality of transmission paths 406-1 to 406-N. According to a MIMO transmission scheme, the modulation symbols may be multiplexed, or the same modulation symbols may be provided through the plurality of transmission paths 406-1 to 406-N.

The plurality of transmission paths 406-1 to 406-N convert the digitally beamformed digital signals into analog signals. Each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an OFDM scheme, and may be omitted when another physical-layer scheme (e.g., an FBMC) is applied. That is, the plurality of transmission paths 406-1 to 406-N provide independent signal-processing processes for a plurality of streams generated through the digital beamforming. However, depending on the implementation, some of the elements of the plurality of transmission paths 406-1 to 406-N may be used in common.

The analog beamforming unit 408 performs beamforming on analog signals. The analog beamforming unit 408 may multiply analog signals by beamforming weight values. The beamformed weight values are used to change the size and phase of the signal. Specifically, the analog beamforming unit 408 may be variously configured according to the connection structure between the plurality of transmission paths 406-1 to 406-N and antennas. For example, each of the plurality of transmission paths 406-1 to 406-N may be connected to a different antenna array. In another example, the plurality of transmission paths 406-1 to 406-N may be connected to one antenna array. In another example, the plurality of transmission paths 406-1 to 406-N may be adaptively connected to one antenna array, or may be connected to two or more antenna arrays.

Figure 5:
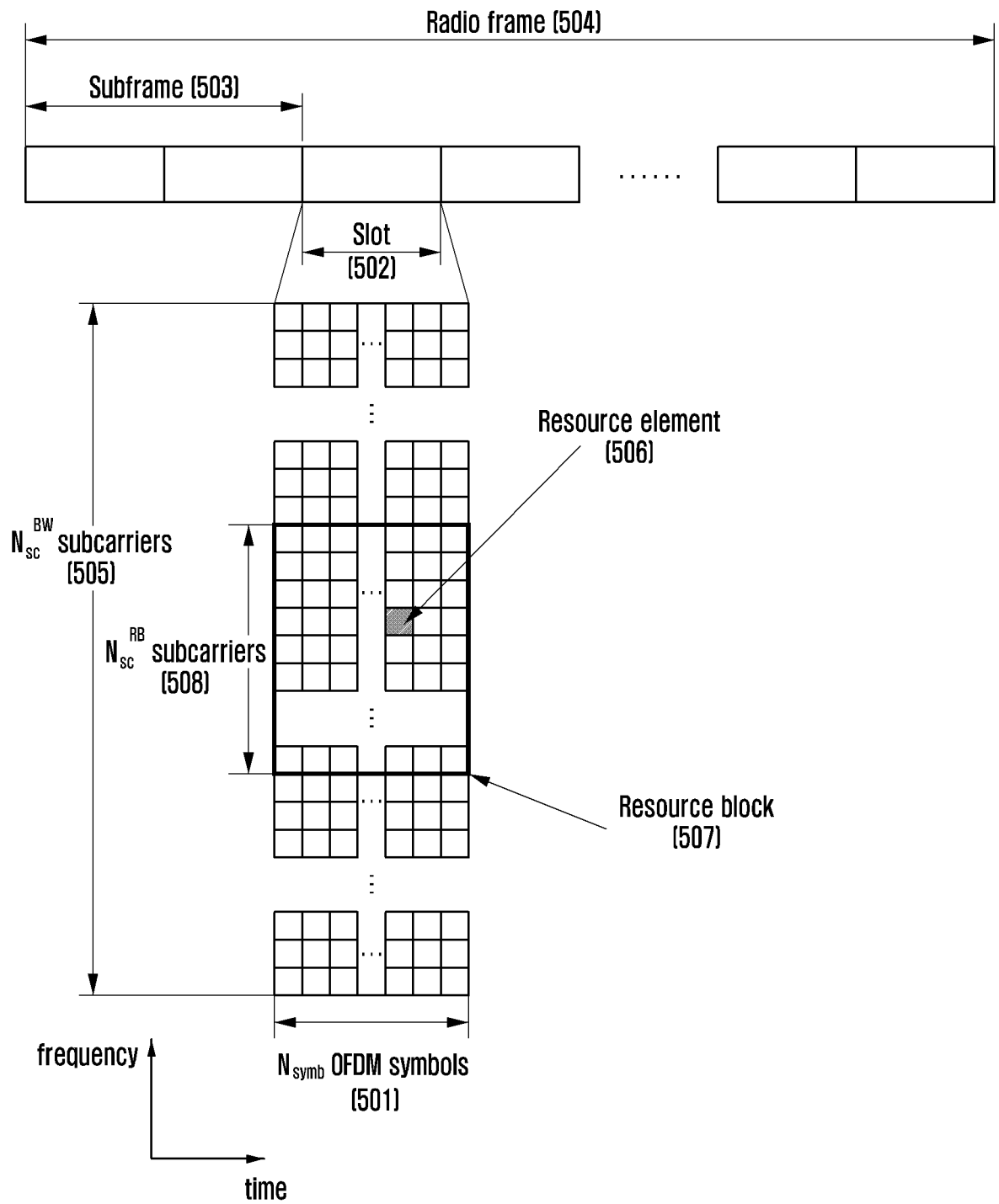
FIG. 5 illustrates a radio resource region in a wireless communication system an embodiment.

FIG. 5 illustrates a radio resource region in a wireless communication system according to an embodiment. The radio resource region may include the structure of a time-frequency domain, and the wireless communication system may include an NR communication system.

Referring to FIG. 5, in the radio resource region, the horizontal axis indicates a time domain, and the vertical axis indicates a frequency domain. The minimum transmission unit of the time domain may be an OFDM symbol and/or a discrete Fourier transform (DFT)-spread-OFDM (DFT-s-OFDM) symbol, and one slot 502 includes $N_{symb}$ OFDM symbols and/or DFT-s-OFDM symbols 501. The OFDM symbol may be used when a signal is transmitted and received using an OFDM multiplexing scheme, and the DFT-s-OFDM symbol may be used when a signal is transmitted and received using a DFT-s-OFDM or SC-FDMA multiplexing scheme. Although FIG. 5 is described below using the OFDM symbol for convenience of description, the embodiment may be applied using the DFT-s-OFDM symbol. Further, although a downlink signal transmission and reception are described for convenience of description, the embodiment may be applied using uplink signal transmission and reception.

The number of slots 502 included in one subframe 503 and the length of the slot 502 may vary depending on subcarrier spacing (SCS). For example, in FIG. 5, SCS is 30 kHz, and one subframe 503 consists of two slots 502. The length of the slot 502 is 0.5 ms and the length of the subframe 503 is 1 ms.

However, if SCS is 15 kHz, one subframe may consist of one slot, and the length of each of the slot and the subframe may be 1 ms, unlike what is illustrated in FIG. 5.

A radio frame 504 may be a time-domain interval including ten subframes. The minimum transmission unit of the frequency domain may be a subcarrier, and the carrier bandwidth included in a resource grid may consist of a total of $N_{SC}^{BW}$ subcarriers 505.

However, SCS, the number of slots 502 included in the subframe 503, the length of the slot 502, and the length of the subframe 503 may be variable. For example, in an LTE system, SCS may be 15 kHz and one subframe 503 may consist of two slots, in which case the length of the slot 502 may be 0.5 ms and the length of the subframe may be 1 ms. In an NR system, SCS ($\mu$) may be one of 15 kHz, 30 kHz, 60 kHz, 120 kHz, and 240 kHz, and the number of slots included in one subframe may be 1, 2, 4, 8, or 16 depending on the SCS ($\mu$).

The basic unit of resources in the time-frequency domain is a resource element (RE) 506, and the RE 506 may be indicated by an OFDM symbol index and a subcarrier index. A resource block (RB) may include a plurality of REs.

In an LTE system, an RB (or a physical RB (PRB)) may be defined by $N_{symb}$ successive OFDM symbols in the time domain and $N_{SC}^{RB}$ successive subcarriers in the frequency domain. The number $N_{symb}$ of symbols included in one RB may be 14 and the number $N_{SC}^{RB}$ of subcarriers may be 12, or the number $N_{symb}$ of symbols may be 7 and the number $N_{SC}^{RB}$ of subcarriers may be 12, and the number $N_{RB}$ of RBs may vary depending on the bandwidth of the system transmission band.

In an NR system, the RB 507 may be defined by $N_{SC}^{RB}$ successive subcarriers in the frequency domain. The number $N_{SC}^{RB}$ of subcarriers may be 12. The frequency domain may include common RBs (CRBs). The PRB may be defined in a bandwidth part (BWP) in the frequency domain. CRB and PRB numbers may be determined differently according to SCS.

DCI may be transmitted in the first N OFDM symbol (s) within the slot. In general, N={1, 2, 3}, and the terminal may receive a configuration of the number of symbols through which DCI can be transmitted through a higher-layer signal from the BS. The BS may change the number of symbols through which DCI can be transmitted in every slot according to the amount of control information to be transmitted in the current slot, and may transfer information on the number of symbols to the terminal through a separate downlink control channel.

In an NR and/or LTE system, scheduling information for downlink data or uplink data may be transmitted from the BS to the terminal through DCI. DCI may be defined according to various formats, and each format may indicate whether DCI includes scheduling information for uplink data (e.g., an uplink grant), whether DCI includes scheduling information for downlink data (e.g., a downlink grant), whether DCI is compact DCI having small control information, whether DCI is fallback DCI, whether spatial multiplexing using multiple antennas is applied, and/or whether DCI is DCI for controlling power. For example, a DCI format (e.g., DCI format 1_0 of NR) corresponding to scheduling control information of downlink data may include at least one piece of the following control information. An NR DCI format 1_0 may include scheduling for downlink data.

Control information format identifier (e.g., a DCI format identifier): indicates an identifier for identifying a DCI format Frequency domain resource assignment: indicates RBs allocated to data transmission Time domain resource assignment: indicates slots and symbols allocated to data transmission Virtual resource block (VRB)-to-PRB mapping: indicates whether to apply a mapping scheme Modulation and coding scheme (MCS): indicates a modulation scheme used for data transmission and the size of a transport block (TB), which is data to be transmitted.

New data indicator (NDI): indicates HARQ initial transmission or HARQ retransmission Redundancy version (RV): indicates a redundancy version of HARQ HARQ process number: indicates a process number of HARQ PDSCH allocation information (e.g., a downlink assignment index): indicates, to the terminal, the number of PDSCH reception results (e.g., the number of HARQ-ACKs) to be reported to the BS Transmit power control (TPC) command for physical uplink control channel (PUCCH): indicates a transmission power control command for a PUCCH, which is an uplink control channel PUCCH resource indicator: indicates PUCCH resources used for an HARQ-ACK report including the result of reception of a PDSCH configured through corresponding DCI PUCCH transmission timing indicator (e.g., a PDSCH-to-HARQ feedback timing indicator): indicates information on slots or symbols through which a PUCCH is transmitted for an HARQ-ACK report including the result of reception of a PDSCH configured through corresponding DCI The DCI may be transmitted through a PDCCH (or control information) or an enhanced PDCCH (EPDCCH) (or enhanced control information) via a channel coding and modulation process. Transmission and reception of the PDCCH or the EPDCCH may be understood as transmission and reception of DCI through the PDCCH or the EPDCCH, and transmission and reception of the PDSCH may be understood as transmission and reception of downlink data through the PDSCH.

A cyclic redundancy check (CRC) scrambled with a specific radio network temporary identifier (RNTI) (or a cell-RNTI (C-RNTI)) independent for each terminal may be added to the DCI, and the DCI for each terminal may be channel-coded, configured as an independent PDCCH, and then transmitted. In the time domain, the PDCCH may be transmitted during a control channel transmission interval. In the frequency domain, the mapping location of the PDCCH may be determined at least by an identifier (ID) of each terminal, and may be transmitted in all or part of the system transmission band.

Downlink data may be transmitted through a PDSCH. The PDSCH may be transmitted after a control channel transmission interval, and scheduling information such as the mapping location of the PDSCH in the frequency domain and the modulation scheme of the PDSCH may be determined based on DCI transmitted through the PDCCH.

Via an MCS of the control information included in the DCI, the BS may report the modulation scheme applied to the PDSCH to be transmitted to the terminal and the size (e.g., a transport block size (TBS)) of data to be transmitted. For example, the MCS may include 5 bits. The TBS corresponds to the TB size before channel coding for error correction is applied to the data (e.g., a TB) to be transmitted by the BS.

A modulation scheme supported for downlink data transmission in an NR system may include at least one of quadrature phase-shift keying (QPSK), 16 quadrature amplitude modulation (QAM), 64 QAM, and 256 QAM, and modulation orders ($Q_m$) thereof may be 2, 4, 6, and 8, respectively. That is, the BS may transmit 2 bits per symbol in the QPSK modulation, 4 bits per symbol in the 16QAM modulation, 6 bits per symbol in the 64QAM modulation, and 8 bits per symbol in the 256 QAM modulation. Further, a modulation scheme greater than or equal to 256 QAM may be used according to system deformation.

In the NR system, an uplink/downlink HARQ scheme may include an asynchronous HARQ scheme in which a data retransmission time point is not fixed. For example, if the BS receives HARQ NACK feedback on data initially transmitted from the terminal in the downlink, the BS may freely determine the time point at which the data is retransmitted via a scheduling operation. For the HARQ operation, the terminal may buffer data determined to be erroneous based on a result of decoding the received data and then combine the data with the data retransmitted by the BS. HARQ ACK/NACK information of a PDSCH transmitted in slot n-k may be transmitted from the terminal to the BS through a PUCCH or a PUSCH in slot n.

For a 5G communication system, such as an NR system, k may be transmitted while being inserted into DCI indicating or scheduling reception of the PDSCH transmitted in slot n-k, or may be configured in the terminal through higher-layer signaling. The BS may configure one or more k values in the terminal through higher-layer signaling, or may indicate a specific k value to the terminal through DCI. k may be determined in consideration of the HARQ-ACK processing capability of the terminal, i.e., a minimum time required to receive the PDSCH and generate and report the HARQ-ACK of the PDSCH. The terminal may use a predefined value or a default value for k before k is configured.

Although embodiments of the disclosure are described based on an NR system, the disclosure is not limited to the NR system, and may be applied to various wireless communication systems such as LTE, LTE-A, LTE-A-Pro, and 5G. Further, although the disclosure describes a system and an apparatus for transmitting and receiving a signal in an unlicensed band, the disclosure can also be applied to a system operating in a licensed band.

Higher-layer signaling or a higher-layer signal may pertain to a method of transmitting a signal from the BS to the terminal through a downlink data channel of a physical layer or from the terminal to the BS through an uplink data channel of a physical layer, and may include at least one signal transmission method through radio resource control (RRC) signaling, packet data convergence protocol (PDCP) signaling, or a media access control (MAC) control element (CE). The higher-layer signaling or the higher-layer signal may include system information, such as a system information block (SIB) transmitted in common to a plurality of terminals.

In a system performing communication in an unlicensed band, a communication device (e.g., the BS or the terminal) to transmit a signal through the unlicensed band may perform a channel access procedure or LBT for the unlicensed band through which the communication device desires to perform communication before transmitting the signal, and if it is determined that the unlicensed band is in an idle state according to the channel access procedure, access the unlicensed band and transmit the signal. If it is determined that the unlicensed is not in the idle state according to the performed channel access procedure, the communication device may not perform signal transmission.

The channel access procedure in the unlicensed band may be distinguished according to whether the time point at which the channel access procedure of the communication device is initiated is fixed (e.g., for frame-based equipment (FBE)) or variable (e.g., for load-based equipment). An FBE device or an LBE device may be selected as the communication device depending on whether a transmission/reception structure of the communication device has one period or no period, as well as the time point at which the channel access procedure is initiated. Fixing the time point at which the channel access procedure is initiated may indicate that the channel access procedure of the communication device may be periodically initiated according to a predefine period or a period declared or configured by the communication device.

In another example, fixing the time point at which the channel access procedure is initiated may indicate that the transmission or reception structure of the communication device has one period.

Varying the time point at which the channel access procedure is initiated may indicate that the time point at which the channel access procedure of the communication device is initiated is possible anytime if the communication device desires to transmit a signal through the unlicensed band. In another example, varying the time point at which the channel access procedure is initiated may indicate that the transmission or reception structure of the communication device may be determined according to the need without one fixed period.

The channel access procedure in the unlicensed band may include a procedure in which the communication device measures the strength of a signal received in the unlicensed band during a fixed time or a time calculated according to a predefined rule (e.g., a time calculated through one random value selected by at least the BS or the terminal) and compares the strength of the signal with a predefined threshold value or a threshold value calculated using a function for determining the strength of the received signal according to one or more parameters, such as a channel bandwidth, a signal bandwidth in which the signal to be transmitted is transmitted, and the strength of transmission power, in order to determine the idle state of the unlicensed band.

For example, the communication device may measure the strength of a signal received during X us (e.g., 25 us) immediately before the signal is transmitted, and if the measured strength of the signal is smaller than a predefined or calculated threshold value T (e.g., −72 dBm), determine that the unlicensed band is in the idle state and transmit the configured signal. As described above, the maximum time during which the signal can be successively transmitted after the channel access procedure may be limited according to an MCOT defined for each country, each region, or each frequency band, or the type of the communication device.

More specifically, if the BS or the terminal desires to transmit a downlink signal or an uplink signal in the unlicensed band, the channel access procedure that can be performed by the BS or the terminal may be divided into at least the following types.

Type 1: an uplink/downlink signal is transmitted after a channel access procedure during a variable time Type 2: an uplink/downlink signal is transmitted after a channel access procedure during a fixed time Type 3: a downlink or uplink signal is transmitted without an LBT procedure for determining channel occupancy by another node in the channel access procedure A transmission device to transmit a signal in the unlicensed band may determine the scheme (or type) of the channel access procedure according to the type of the signal to be transmitted. In the 3GPP, the LBT procedure, which is the channel access procedure, may be divided into four categories. The four categories may include a first category in which LBT is not performed, a second category in which LBT is performed without a random backoff, a third category in which LBT is performed through a random backoff in a contention window having a fixed size, and a fourth category in which LBT is performed through random backoff in a contention window having a variable size. The third category and the fourth category may be applied to type 1, the second category may be applied to type 2, and the first category may be applied to type 3.

For example, if the BS desires to transmit a downlink signal including a downlink data channel in the unlicensed band, the BS may perform a channel access procedure of type 1. If the BS desires to transmit a downlink signal that does not include a downlink data channel, e.g., a synchronization signal or a downlink control channel, in the unlicensed band, the BS may perform a channel access procedure of type 2 and transmit the downlink signal.

The type of the channel access procedure may be determined according to a transmission length of a signal to be transmitted in the unlicensed band or the length of a time or interval during which the unlicensed band is used. In general, it takes longer to perform the channel access procedure of type 1 than the channel access procedure of type 2. Accordingly, if the communication device desires to transmit a signal during a short time interval or a time shorter than a reference time (e.g., X ms or Y symbols), the channel access procedure of type 2 may be performed. However, if the communication device desires to transmit a signal during a long time interval or a time greater than or equal to a reference time, the channel access procedure of type 1 may be performed. Essentially, channel access procedures of different types may be performed depending on the amount of time during which an unlicensed band is used.

If the transmission device performs the channel access procedure of type 1 according to at least one of the references, the transmission device may determine a channel access priority class (or a channel access priority) according to a quality of service class identifier (QCI) of a signal to be transmitted in the unlicensed band and perform the channel access procedure using at least one value among the predefined configuration values shown in Table 1 for the determined channel access priority class. Table 1 below shows the mapping relationship between the channel access priority class and the QCI.

For example, QCIs 1, 2, and 4 are QCI values for services such as conversational voice, conversational video (live streaming), and non-conversational video (buffered streaming), respectively. If a signal for a service that does not match the QCI in Table 1 is transmitted in the unlicensed band, the transmission device may select the QCI that is the closest to the service and the QCI in Table 1 and select a channel access priority class therefor.

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

Parameters for the channel access priority classes, such as defer duration, a set (CW_p) of values or sizes of contention window values, a minimum value and a maximum value (CW_min,p and CW_max,p) of the contention window, and a maximum channel occupancy interval (T_mcot,p)) according to the determined channel access priority class (p) may be determined as shown in Table 2 below. Table 2 shows parameter values for channel access priority classes in the downlink.

The BS that desires to transmit a downlink signal in the unlicensed band may perform a channel access procedure for the unlicensed band during a minimum of the time T_f+m_p*T_sl. If the BS performs the channel access procedure according to channel access priority class 3 (p=3), the size of the defer duration T_f+m_p*T_sl required to perform the channel access procedure may be configured using m_p=3. T_f is a value fixed to 16 us, and a first time T_sl among T-f should be in an idle state. In the time T_f, the BS may not perform the channel access procedure during the remaining time (T_f−T_sl) after the time T_sl. Even though the BS performs the channel access procedure during the remaining time (T_f−T_sl), the result of the channel access procedure may not be used. The time T_f−T_sl is a delay time of the channel access procedure of the BS.

If it is determined that the unlicensed band is in the idle state during all of the time m_p*T_sl, N may be N−1. N may be selected as a random integer value between 0 and the value of the contention window (CW_p) at the time point at which the channel access procedure is performed. For channel access priority class 3, the minimum contention window and the maximum contention window are 15 and 63, respectively. If it is determined that the unlicensed band is in the idle state in the defer duration and in an additional interval in which the channel access procedure is performed, the BS may transmit a signal through the unlicensed band for a time of T_mcot,p (8 ms).

Table 2 shows channel access priority classes (or channel access priorities) in the downlink. The disclosure describes embodiments based on downlink channel access priority classes for convenience of description. In the uplink, the same channel access priority classes of Table 2 may be used, or separate channel access priority classes for uplink transmission may be used.

TABLE 2

| Channel Access Priority Class (p) | $m_p$ | $CW_{min,p}$ | $CW_{max,p}$ | $T_{m\,cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window (CW_p) is the minimum value of the contention window (CW_min,p). The BS selecting the N value may perform the channel access procedure in the interval T_sl and, if the unlicensed band is determined to be in the idle state through the channel access procedure performed in the interval T_sl, change N to N−1, and if N becomes 0, transmit a signal through the unlicensed band during a maximum of the time T_mcot,p. If the unlicensed band determined through the channel access procedure in the time T_sl is not in the idle state, the BS may again perform the channel access procedure without any change in N.

The size of the contention window (CW_p) may be changed or maintained according to the ratio (Z) of NACK to reception results (ACK/NACK) of downlink data that one or more terminals receiving downlink data (e.g., downlink data received in a reference subframe or a reference slot) transmitted through a downlink data channel in a reference subframe or a reference slot transmits or reports to the BS. The reference subframe or the reference slot may be determined as the first subframe or slot of a downlink signal transmission interval (or an MCOT) that the BS most recently transmitted through the unlicensed band at the time at which the BS initiates the channel access procedure, the time at which the BS selects the N value to perform the channel access procedure, or immediately before the two times, a transmission time interval (TTI), or a starting subframe or a starting slot of the transmission interval.

Figure 6:
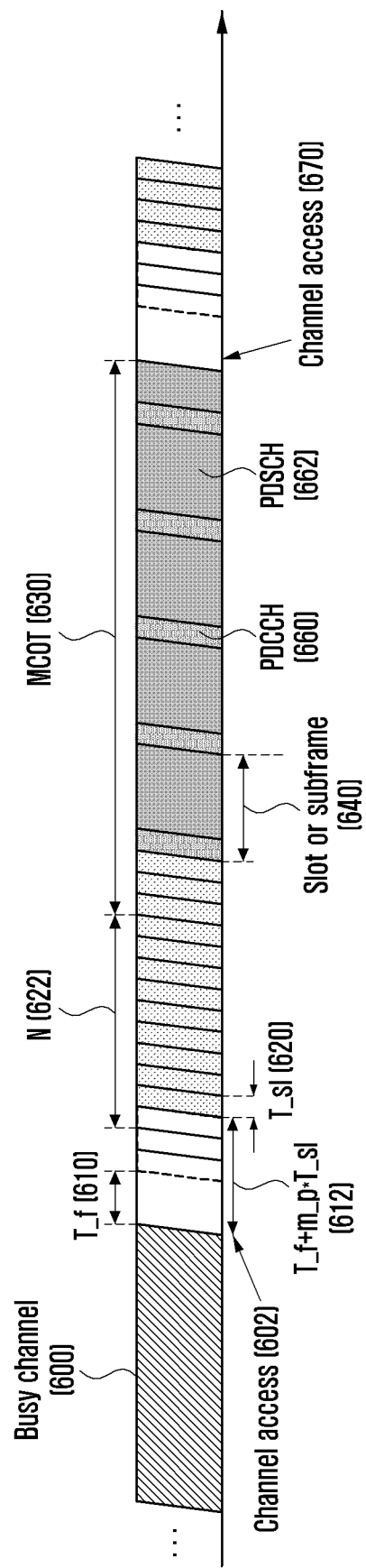
FIG. 6 illustrates a channel access procedure in an unlicensed band in a wireless communication system according to an embodiment.

FIG. 6 illustrates a channel access procedure in an unlicensed band in a wireless communication system according to an embodiment.

Referring to FIG. 6, a BS may attempt channel access in order to occupy the unlicensed band. A first slot (or a starting slot in which a channel occupancy interval is initiated) of a downlink signal transmission interval 630 (COT) or the subframe 640 that the BS most recently transmitted through the unlicensed band at the time point 670 at which the channel access procedure is initiated, the time point at which the BS selects the N value to perform the channel access procedure, or a time point immediately before the time point may be defined as a reference slot or a reference subframe (or a reference slot).

Specifically, one or more successive slots including the first slot in which a signal is transmitted among all slots of the downlink signal transmission interval 630 may be defined as reference slots. If the downlink signal transmission interval starts after the first symbol of the slot, a slot for starting downlink signal transmission and a slot after the slot may be defined as reference slots. If a ratio of NACK to reception results for downlink data that one or more terminals receiving the downlink data transmitted through a downlink data channel in the reference slot transmit or report to the BS is greater than or equal to Z, the BS may determine the value or size of the contention window used for a channel access procedure 670 of the corresponding BS as contention window which is next larger than the contention window used for the previous channel access procedure 602 The BS may increase the size of the contention window used for the channel access procedure 602. The BS may perform the following channel access procedure 670 by selecting N 633 within a range defined according to the contention window having the increased size.

If the reception result for the downlink data channel that the BS transmits in the reference slot of the transmission interval 630 cannot be obtained, e.g., if a time interval between the reference slot and the time point 670 at which the BS initiates the channel access procedure is less than or equal to n slots or symbols (i.e., if the BS initiates the channel access procedure before the minimum time during which the terminal can report the reception result for the downlink data channel transmitted in the reference slot to the BS), the first slot of the most recent downlink signal transmission interval transmitted before the downlink signal transmission interval 630 may be a reference slot.

If the reception result for downlink data transmitted in a reference slot 640 at the time point 670 at which the BS initiates the channel access procedure, a time point at which the BS selects N to perform the channel access procedure, or immediately before the time point is not received from the terminal, the BS may determine a contention window based on a result of the reception of the downlink data of the terminal for the reference slot in the most recently transmitted downlink signal transmission interval among the reception results for the downlink data channel that have been received from terminals. The BS may determine the size of the contention window used for the channel access procedure 670 based on the downlink data reception result received from terminals for the downlink data transmitted through the downlink data channel in the reference slot.

The BS transmitting a downlink signal through a channel access procedure (e.g., CW_p=15) configured according to channel access priority class 3 (p=3) may increase the contention window from an initial value (CW_p=15) to the next contention window value (CW_p=31) if it is determined that 80% or more of reception results are NACK among the results of reception by the terminal of downlink data transmitted to the terminal through the downlink data channel in the reference slot among downlink signals transmitted through the unlicensed band. The proportional value of 80% is only an example and can be variously modified.

If 80% or more of reception results are determined not to be NACK among the results of reception by the terminal, the BS may maintain the value of the contention window at the existing value, or may change the same to the initial value of the contention window. The change in the contention window may be applied in common to all the channel access priority classes or may be applied only to the channel access priority class used for the channel access procedure. A method of determining the reception result that is valid for determining the change in the size of the contention window among the reception results for downlink data that the terminal transmits or reports to the BS for downlink data transmitted through a downlink data channel in the reference slot in which the change in the size of the contention window, i.e., a method of determining a Z value, is described below.

If the BS transmits one or more codewords (CWs) or TBs to one or more terminals in the reference slot, the BS may determine the Z value as a ratio of NACK to the reception results transmitted or reported by the terminal for the TBs received in the reference slot. For example, if two CWs or two TBs are transmitted to one terminal in the reference slot, the BS may receive the result of reception of the downlink data signal for the two TBs from the terminal. If the ratio (Z) of NACK to the two reception results is larger than or equal to a threshold value (e.g., Z=80%) predefined or configured between the BS and the terminal, the BS may change or increase the size of the contention window.

If the terminal bundles the results of reception of downlink data for one or more slots (e.g., M slots) including the reference slot and transmits or reports the same to the BS, the BS may determine that the terminal transmits M reception results. The BS may determine the Z value as the ratio of NACK to the M reception results and change, maintain, or initialize the size of the contention window.

If the reference slot is a second slot among the two slots included in one subframe or if a downlink signal is transmitted in a symbol after a first symbol in the reference slot, the reference slot and the next slot are determined as reference slots, and the ratio of NACK to reception results that the terminal transmits or reports to the BS for downlink data received in the reference slot may be determined as the Z value.

If scheduling information for a downlink data channel transmitted by the BS or DCI is transmitted in a cell in which a downlink data channel is transmitted, a cell which is the same as a frequency band, or the frequency band or if scheduling information for a downlink data channel transmitted by the BS or DCI is transmitted in an unlicensed band but is transmitted in a cell different from the cell in which the downlink data channel is transmitted or on another frequency, the BS may determine the result of reception by the terminal as NACK and determine the Z value, when it is determined that the terminal does not transmit the reception result for downlink data received in the reference slot and when the reception result that the terminal transmits for downlink data is determined to be at least one of DTX, NACK/DTX, or any state.

If scheduling information for a downlink data channel transmitted by the BS or DCI is transmitted through a licensed band, the BS may not reflect the result of reception by the terminal in the reference value Z of a contention window change, when the reception result that the terminal transmits for downlink data is determined to be at least one of DTX, NACK/DTX, or any state. In other words, the BS may ignore the result of reception by the terminal and determine the Z value.

If the BS transmits scheduling information for a downlink data channel or DCI through a licensed band, the BS may ignore the reception result transmitted or reported by the terminal for downlink data and determine the Z value when the BS actually transmits no downlink data (no transmission) in the result of reception of the downlink data for the reference slot that the terminal transmits or reports to the BS.

Figure 7:
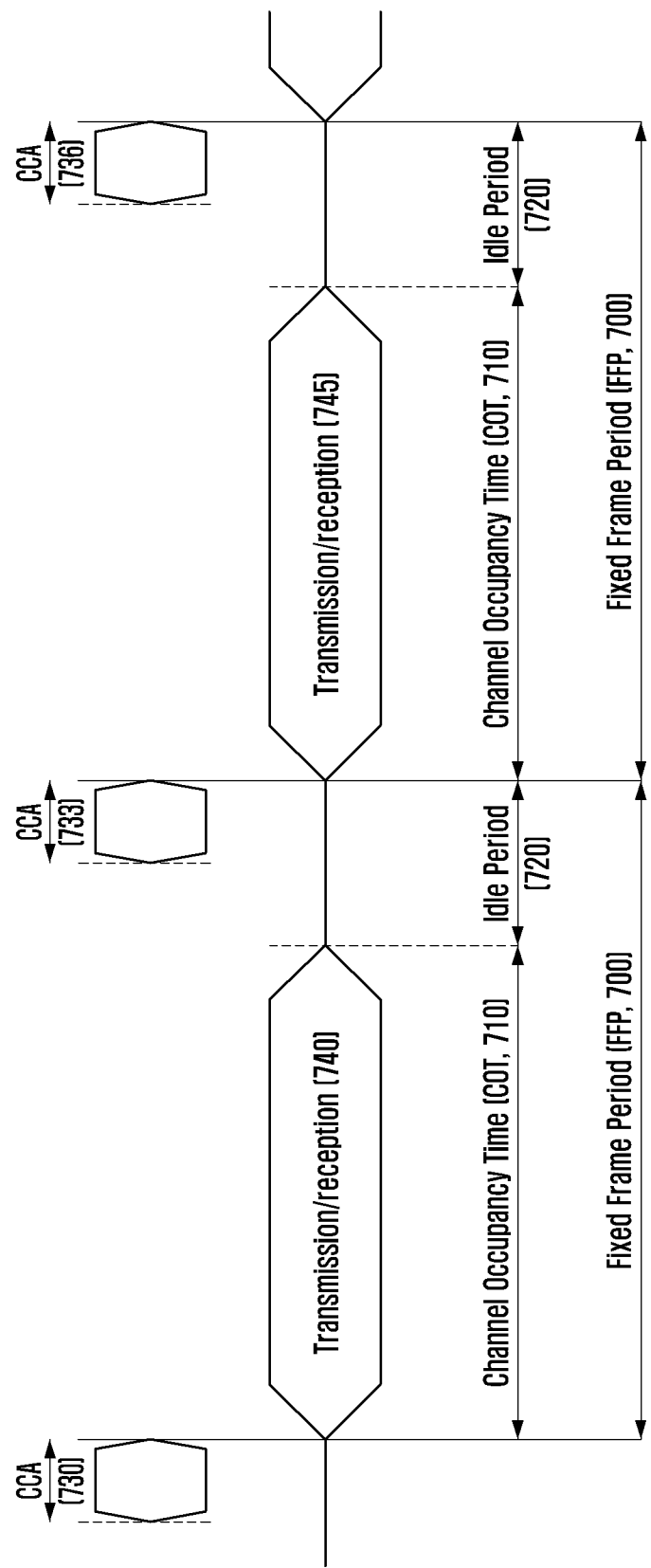
FIG. 7 illustrates a channel access procedure in an unlicensed band in a wireless communication system according to an embodiment.

FIG. 7 illustrates a channel access procedure in an unlicensed band in a wireless communication system according to an embodiment.

Referring to FIG. 7, a communication device performing a frame-based channel access procedure may periodically transmit and receive a signal according to a fixed frame period (FFP) 700. An FFP 700 may be indicated or configured by the communication device, and may range from 1 ms to 10 ms. The channel access procedure (or clear channel assessment (CCA)) for the unlicensed band may be performed immediately before every frame period 730, 733, and 736, and may be performed during a fixed time or during a single observation slot, like the type 2 channel access procedure. If it is determined that the unlicensed band is in the idle state or is an idle channel based on a result of the channel access procedure, the communication device may transmit and receive a signal without any separate channel access procedure during a maximum of 95% of the time of the FFP 700 (i.e., COT 710). A time of at least 5% of the FFP 700 is an idle time 720 in which no signal is transmitted and received, and the channel access procedure may be performed within the idle time 720.

The frame-based channel access procedure has a relatively simple method of performing the channel access procedure compared to the traffic-based channel access procedure, and has an advantage of being capable of periodically performing unlicensed band channel access. However, since the time point at which the channel access procedure is initiated is fixed, the frame-based channel access procedure has a disadvantage of low probability of access to the unlicensed band compared to the traffic-based channel access procedure.

Accordingly, a 5G system should flexibly define the frame structure in consideration of various services and requirements. For example, respective services may have different SCSs according to requirements. The current 5G communication system may support a plurality of SCSs, and the SCSs may be determined based on Equation (1).

$$\Delta f = f_0 2^m \tag{1}$$

In Equation (1), $f_0$ denotes a default SCS of the system, m denotes an integer scaling factor, and $\Delta f$ denotes SCS. For example, if $f_0$ is 15 kHz, a set of SCS that the 5G communication system can have may be one of 3.75 kHz, 7.5 kHz, 15 kHz, 30 kHz, 60 kHz, 120 kHz, 240 kHz, and 480 kHz. The available SCS set may vary depending on the frequency band. For example, 3.75 kHz, 7.5 kHz, 15 kHz, 30 kHz, and 60 kHz may be used in a frequency band that is less than or equal to 6 GHz, and 60 kHz, 120 kHz, and 240 kHz may be used in a frequency band greater than or equal to 6 GHz.

The length of an OFDM symbol may vary depending on the SCS belonging to the corresponding OFDM symbol because the SCS and the length of the OFDM symbol have an inverse relationship therebetween based on the characteristic of the OFDM symbol. For example, if SCS is doubled, the symbol length is halved. If SCS is halved, the symbol length is doubled.

Figure 8:
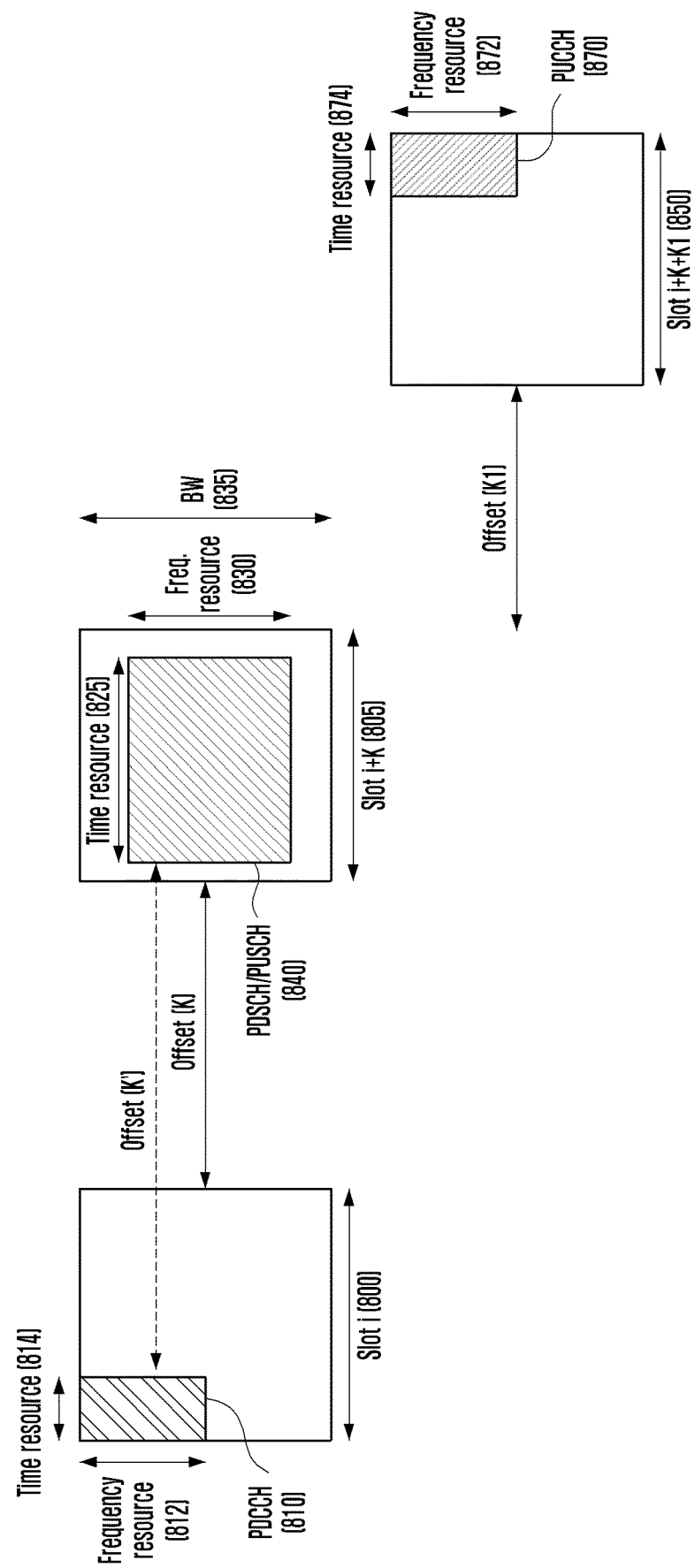
FIG. 8 illustrates scheduling and feedback in a wireless communication system according to an embodiment.

FIG. 8 illustrates scheduling and feedback in a wireless communication system according to an embodiment.

Referring to FIG. 8, a resource region in which a data channel is transmitted in a 5G or NR communication system is illustrated. A terminal may monitor and/or search for a PDCCH 810 in a downlink control channel (or PDCCH) region (or a control resource set (CORESET) or a search space (SS)) configured by a BS through a higher-layer signal. The downlink control channel region may include a time domain 814 and a frequency domain 812. Information on the time domain 814 may be configured in units of symbols, and information on the frequency domain 812 may be configured in units of RBs or RB groups.

If the terminal detects a PDCCH 810 in slot i 800, the terminal may acquire DCI transmitted through the detected PDCCH 810. Through the received DCI, the terminal may acquire scheduling information for a downlink data channel or an uplink data channel 840. The DCI may include information on a resource region (or PDSCH transmission region) through which the terminal should receive downlink data (or a PDSCH) transmitted from the BS or information on a resource region that the terminal receives from the BS for transmission of uplink data (or a PUSCH).

The case in which the terminal receives scheduling of data transmission through a PUSCH will be described below by way of example.

The terminal receiving the DCI may acquire a slot index for receiving the PUSCH or offset information (K) through the DCI and determine a PUSCH transmission slot index. The terminal may determine that scheduling is performed to transmit the PUSCH in slot i+K 805 through the received offset information (K) based on slot index i 800 through which the PDCCH 810 is received. The terminal may determine slot i+K 805 or a PUSCH start symbol or time in slot i+K through the received offset information (K) based on the CORESET through which the PDCCH 810 is received.

The terminal may acquire information on a time-frequency resource region 840 in the PUSCH transmission slot 805 based on the DCI. The PUSCH transmission frequency resource region information 830 may include information in units of PRBs or PRB groups. The PUSCH transmission frequency resource region information 830 may be information on a region included in an initial uplink bandwidth (BW) or an initial uplink BWP determined or configured in the terminal through an initial access procedure. If the terminal receives a configuration of the uplink BW or the uplink BWP through a higher layer, the PUSCH transmission frequency resource region information 830 may be information on a region included in the uplink BW or the uplink BWP configured through the higher-layer signal.

The PUSCH transmission time resource region information 825 may be information in units of symbols or symbol groups or information indicating absolute time information. The PUSCH transmission time resource region information 825 may be indicated by a combination of the PUSCH transmission start time or symbol and the PUSCH length or the PUSCH end time or symbol, and may be included in the DCI as one field or value. The terminal may transmit the PUSCH in the PUSCH transmission resource region 840 determined through the DCI.

The terminal receiving the PDSCH 840 may report (feedback) the reception result (e.g., HARQ-ACK/NACK) of the PDSCH 840 to the BS. Uplink control channel (PUSCH 870) transmission resources for transmitting the result of reception of the PDSCH 840 may be determined by the terminal based on a PDSCH-to-HARQ timing indicator indicated through the DCI 810 for scheduling the PDSCH 840 and a PUCCH resource indicator. The terminal receiving K1 of the PDSCH-to-HARQ timing indicator through the DCI 810 may transmit a PUCCH 870 in slot i+K+K1 850 after K1 from the reception slot 850 of the PDSCH 840. Through transmission resources of the PUCCH 870 in the PUCCH transmission slot 850, the PUCCH may be performed in resources indicated through the PDCCH resource indicator of the DCI 810. If a plurality of PUCCH transmissions is configured or indicated in the PUCCH transmission slot 850, the terminal may transmit the PUCCH in PUCCH resources other than the resources indicated through the PUCCH resource indicator of the DCI 810.

In a 5G communication system, in order to dynamically change downlink signal transmission and uplink signal transmission intervals in a time-division-duplex (TDD) system, whether each of OFDM symbols included in the one slot is a downlink symbol, an uplink symbol, or a flexible symbol may be indicated by a slot format indicator (SFI). A symbol indicated as a flexible symbol may be a symbol which is neither a downlink nor uplink symbol but can be changed to a downlink or uplink symbol using terminal-specific control information or scheduling information. The flexible symbol may include a gap guard required for a process of switching from the downlink to the uplink.

The SFI may be simultaneously transmitted to a plurality of terminals through a terminal group (or cell) common control channel. The SFI may be transmitted through a CRC scrambled PDCCH with an identifier (e.g., an SFI-RNTI) different from a terminal unique identifier (cell-RNTI (C-RNTI)). The SFI may include information on N slots, and N may have an integer larger than 0, a natural number, or a value that the BS configures in the terminal through a higher-layer signal among a set of available predefined values, such as 1, 2, 5, 10, and 20. Further, the size of the information on the SFI may be configured in the terminal by the BS through a higher-layer signal. Examples of slot formats indicated by the SFI are as shown in Table 3.

TABLE 3

| Format | Symbol number (or index) within one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |

TABLE 3-continued

| | Symbol number (or index) within one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | F | U | U | U |
| 32 | D | D | D | D | D | D | D | D | D | F | F | U | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | F | F | F | F | F | F | U | U | U |
| 45 | D | D | D | D | D | F | F | U | U | U | U | U | U | U |
| 46 | D | D | D | D | F | U | D | D | D | D | D | F | U | U |
| 47 | D | D | F | U | U | U | D | D | F | U | U | U | U | U |
| 48 | D | F | U | U | U | U | D | F | U | U | U | U | U | U |
| 49 | D | D | D | D | F | F | U | D | D | D | F | F | U | U |
| 50 | D | D | F | F | U | U | D | D | F | F | U | U | U | U |
| 51 | D | F | U | U | U | U | D | F | U | U | U | U | U | U |
| 52 | D | F | F | F | F | U | D | F | F | F | F | F | F | U |
| 53 | D | D | F | F | F | U | D | D | F | F | F | F | F | U |
| 54 | F | F | F | F | F | F | D | D | D | D | D | D | D | D |
| 55 | D | D | F | F | U | U | D | D | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

In Table 3, D denotes the downlink, U denotes the uplink, and F denotes a flexible symbol, and the total number of supportable slot formats is 256. In the current NR system, the maximum size of SFI information bits is 128 bits, and the SFI information bits correspond to a value that can be configured in the terminal by the BS through a higher-layer signal (e.g., dci-payloadsize).

The SFI information may include slot formats for a plurality of serving cells, and slot formats for respective serving cells may be distinguished by serving cell IDs. Further, for each serving cell, a combination of SFIs of one or more slots may be included. If the size of SFI information bits is 3 bits and the SFI information includes a SFI for one serving cell, the 3-bit SFI information may configure a total of 8 SFIs or SFI combinations, and the BS may indicate one of the 8 SFIs through terminal-group-common control information (group-common DCI) (or SFI information).

At least one SFI among the 8 SFIs may be an SFI for a plurality of slots. For example, Table 4, below, indicates an example of 3-bit SFI information including the slot formats in Table 3. Five pieces of the SFI information (slot format combination IDs 0, 1, 2, 3, and 4) may be SFIs for one slot, and the remaining 3 pieces may be information on SFIs (slot format combination IDs 5, 6, and 7) for four slots, and may be sequentially applied to the four slots.

| Slot format combination ID | Slot Formats |
|---|---|
| 0 | 0 |
| 1 | 1 |
| 2 | 2 |
| 3 | 19 |
| 4 | 9 |
| 5 | 0000 |
| 6 | 1111 |
| 7 | 2222 |

The terminal may receive configuration information or a PDCCH for detecting SFI information through a higher-layer signal, and may detect the SFI according to the configuration. The terminal may receive a configuration of at least one of a CORESET in which SFI information is detected, a search space, RNTI information used for CRC scrambling of DCI through which SFI information is transmitted, and period and offset information of the search space through a higher-layer signal.

Figure 9:
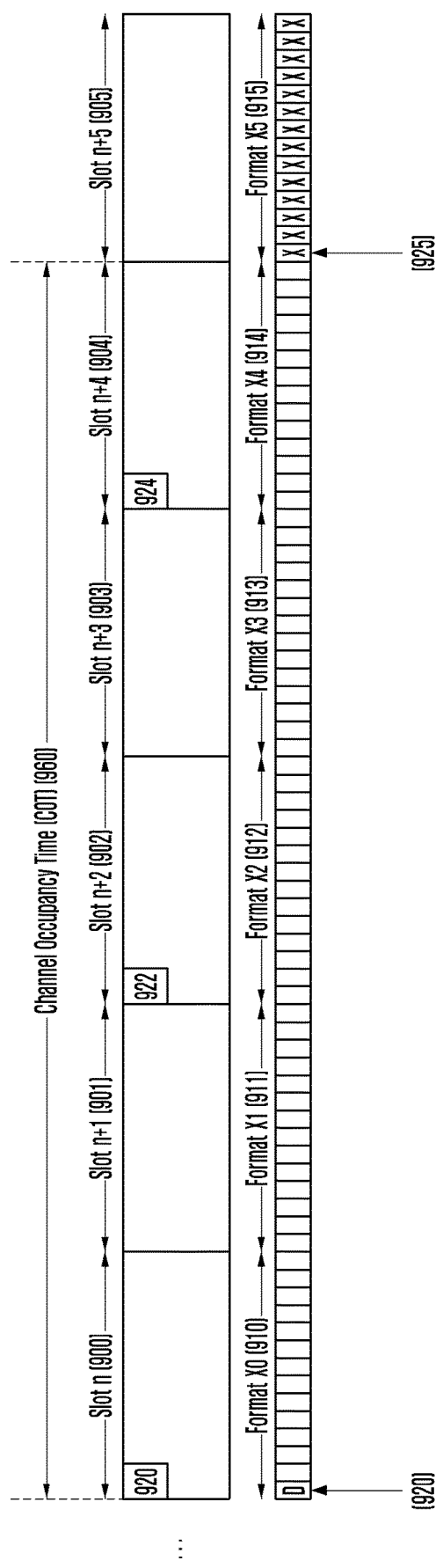
FIG. 9 illustrates a channel occupancy time (COT) in a wireless communication system according to an embodiment.

FIG. 9 illustrates a COT in a wireless communication system according to an embodiment.

Referring to FIG. 9, PDCCH regions 920, 922, and 924 in which the terminal should detect SFI information are illustrated, and the period of the PDCCH region is 2 slots. The terminal may detect CRC-scrambled DCI with a SFI identifier (e.g., an SFI-RNTI or a new RNTI) in the PDCCH regions 920, 922, and 924 (or CORESET) of slots n 900, slot n+2 902, and slot n+4 904 according to the configured PDCCH region and the period thereof, and may acquire SFIs of two slots through the detected DCI. SFI information of two or more slots may be included in the detected DCI, and the number of slots for which SFIs are included in the DCI may be configured through a higher-layer signal. Configuration information indicating the number of slots for which SFIs are included in the DCI may be included in a higher-layer signal that is the same as the higher-layer signal for configuring SFI information. For example, the terminal may acquire slot formation indicator information 910 and 911 for slot n 900 and slot n+1 901 in the PDCCH region 920 of slot n 900. SFI information 910, 911, 913, and 914 may have at least one value among the formats in Table 3. However, a new format other than the formats in Table 3 may be used.

If the BS transmits SFI information in the unlicensed band, and particularly, if the SFI information includes SFIs for a plurality of slots, the BS may not determine SFI information for one or more slots according to whether a channel of the unlicensed band is accessed. When transmitting SFI information 914 and 915 for slot n+4 904 and slot n+5 905 in a PDCCH 924, the BS may need to determine how to indicate SFI information of slot n+5 905. The BS may indicate that an SFI in a time other than a COT is flexible.

In a frequency band of 7.125 GHz addressed by the 5G communication system or a lower frequency band, one carrier may use a maximum of 100 MHz frequency bands. In a frequency band higher than 7.125 GHz or a mmWave frequency band, one carrier may use a maximum of 400 MHz frequency bands. The terminal may communicate with the BS through some of the frequency bands of the carrier (hereinafter, referred to as a BWP, and the BWP may be configured by the BS through a higher-layer signal. The BS and the terminal performing communication using the unlicensed band perform the channel access procedure for the unlicensed band before transmitting a signal through the unlicensed band. An unlicensed band near 5 GHz may be divided into channels in units of 20 MHz. Various communication devices may perform the channel access procedure for each channel divided in units of 20 MHz and perform communication using the unlicensed band. Accordingly, if the communication device desires to perform communication through the unlicensed band in the 5G communication system, which can use the broadband, the communication device may perform the channel access procedure in units of 20 MHz.

In order to specify a downlink signal considered to determine the size of the contention window, at least one of a subband or subchannel, a slot, a downlink data channel, a CBG, and a downlink control channel may be determined as the reference.

Figure 10:
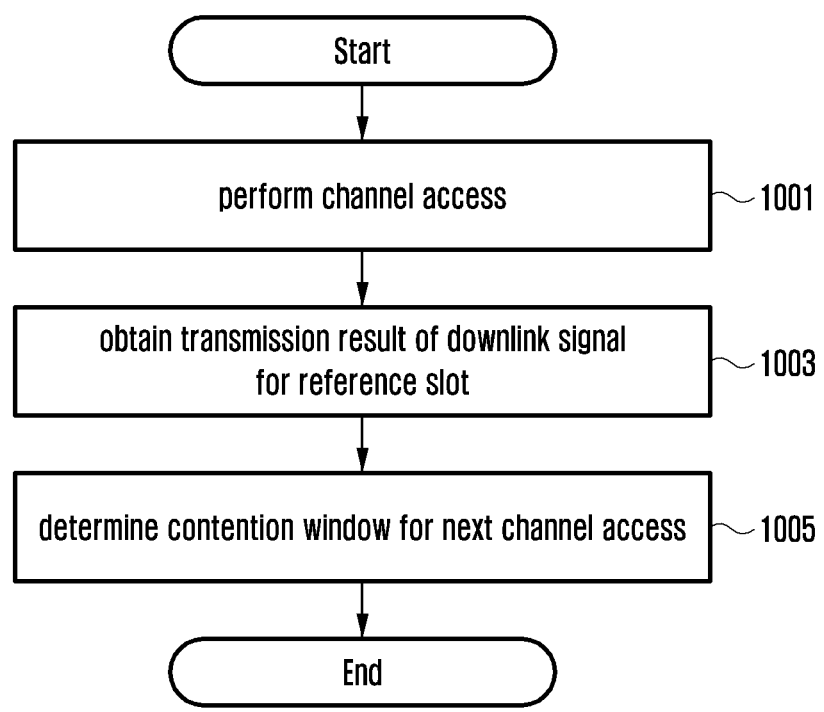
FIG. 10 is a flowchart illustrating an operation of a BS for channel access in a wireless communication system according to an embodiment.

FIG. 10 is a flowchart illustrating an operation of a BS for a channel access procedure in a wireless communication system according to an embodiment.

Referring to FIG. 10, the BS performs channel access in step 1001. The BS may perform a channel access procedure to use an unlicensed band. The BS may perform channel sensing, e.g., LBT, in order to determine whether a channel of the unlicensed band is used by another node. The BS may determine whether detected traffic for channel occupancy by another node in the unlicensed band is greater than or equal to a threshold value. If traffic lower than the threshold value is not detected during a predetermined interval, the BS may determine that the channel is empty. The state in which the channel is empty may be referred to as an idle state. If it is determined that the unlicensed band is in the idle state, the BS may occupy the channel for a predetermined time. The BS may transmit a downlink signal to the terminal for a predetermined time. The downlink signal may be a downlink control signal or may include downlink data. If it is determined that the unlicensed band is not in the idle state, the BS may continue to perform the channel access procedure in step 1001.

In step 1003, the BS obtains a result of a transmission of a downlink signal for a reference slot. The reference slot may be a slot in which a downlink signal is transmitted. The downlink signal may be a downlink signal for providing required HARQ-ACK information when a parameter (Z) used for adjusting a contention window is calculated. The slot may be a unit of a time domain in which a length is defined according to the configuration of SCS. The slot may be 1 ms or 0.5 ms. The downlink signal may be a signal transmitted in a first slot in most recent downlink transmission including a downlink data channel or a downlink control channel before the next channel access procedure (e.g., a channel access procedure after step 1001).

In order to occupy the channel through the next channel access procedure, channel sensing is required. The interval at which channel sensing is performed may be determined based on a size of a contention window. If simultaneous transmission by the BS and another node occurs in the same time resource, the collision probability may increase, and such a collision may cause transmission failure of the signal. Therefore, it may be preferable to reflect the collision situation in channel sensing. Accordingly, the BS may determine the size of the contention window in consideration of whether the BS collides with another device during a previous COT.

In order to occupy the unlicensed band, the BS and another node may perform the channel access procedure. Since a signal greater than or equal to a threshold value of the other node is not detected while the BS performs channel sensing, the BS may determine that the channel of the other node is in the idle state during channel sensing within the contention window. If the other node performs the channel access procedure after downlink transmission of the BS, the other node may detect that the current channel is busy due to downlink transmission of the BS. However, the other node cannot detect that the current channel is busy before the BS performs downlink transmission, and thus, the transmission of the BS has a high probability of collision with the other node in a first time interval (e.g., a starting slot), after downlink transmission is initiated. The time point at which the BS initiates channel occupancy, i.e., the starting part (e.g., a starting slot or a starting subframe) of the COT by downlink transmission may be an interval in which channel occupancy is initiated by the other node after the channel access procedure is performed. Since the other node does not identify the channel occupancy of the BS during the channel access procedure, the other node may transmit a signal in the interval in which downlink transmission of the BS is initiated, and accordingly a transmission collision may occur. Accordingly, the BS may determine the reference slot of the contention window in consideration of the high probability of transmission collision between nodes immediately after downlink transmission is initiated.

The reference slot may be a slot in which a signal determined to be required for adjusting the contention window is transmitted. The BS may determine the reference slot in various ways. The BS may determine a first slot as the reference slot. The downlink transmission may be the downlink transmission most recently occupied by the BS before a next channel access of step 1005 described below.

The downlink transmission may include transmission in at least one of a control channel (e.g., a PDCCH) or a data channel (e.g., a PDSCH). The BS may determine the slot in which data is first transmitted during downlink transmission as the reference slot. The downlink transmission may be the most recent transmission including a downlink data channel among downlink transmissions before channel access in step 1005 described below. The BS may determine the slot in which a control channel is first transmitted during downlink transmission to be the reference slot. The downlink transmission may be the most recent transmission including a downlink control channel among downlink transmissions before channel access in step 1005 described below.

The reference slot may include the starting slot and a slot after the starting slot. The BS may determine a starting slot (n) of the most recent downlink transmission and the next slot (n+1) as reference slots. For example, if a downlink signal is transmitted starting from an intermediate slot rather than a first symbol of the starting slot (n), the BS may determine the starting slot and the next slot to be reference slots. The BS may determine three or more slots as well as two slots as reference slots in the same way.

As described above, the use of more than one slots as reference slots may be valid when some of the downlink signals desired to be transmitted in the starting slot (n) of the most recent downlink transmission are punctured and transmitted according to the result of the channel access procedure, when the downlink signal up to a symbol right before the symbol that can be occupied after the channel access procedure is punctured and transmitted using the remaining symbols, or when the downlink signal desired to be transmitted in the slot (n) is rate-matched and transmitted using symbols that can be occupied after the channel access procedure. If the downlink signal is punctured or rate-matched and transmitted in the starting slot (n) of downlink transmission according to the result of the channel access procedure, the probability of the terminal not correctly receiving the downlink data channel in the slot (n) increases. For example, as the coding rate of the downlink data channel increases in puncturing or rate-matching, the terminal becomes increasingly unable to correctly receive the downlink data channel. That is, a probability of NACK increases. Because the NACK is not generated due to a collision with another transmission node, the starting slot (n) and the next slot (n+1) may be determined as reference slots. The BS may determine the reference slot differently according to whether or not the BS can receive the result of reception by the terminal of the downlink data channel in units of CBGs. For example, if the BS can receive the result of reception by the terminal of the downlink data channel in units of CBGs, a slot in which a downlink data channel of which initial transmission starts in the most recent downlink transmission including the downlink data channel is located may be determined as the reference slot. Otherwise, a first slot (or a starting slot) of the most recent downlink transmission and the next slot may be determined as reference slots. The BS may determine the reference slot differently according to whether or not the UE reception capability for the downlink data channel is at least unrelated to the time point at which the BS initiates channel access. For example, if the UE reception capability for one or more of the downlink data channels is unrelated to the time point at which the BS initiates channel access, if a first symbol of the downlink data channel which the BS desires to transmit to the terminal is a symbol simultaneous with or later than the time point at which the BS initiates channel access, the BS may determine a slot in which a downlink data channel of which initial transmission starts in the most recent downlink transmission including the downlink data channel is located as the reference slot. Otherwise, the BS may determine the first slot of the most recent downlink transmission and the next slot as reference slots.

The BS may transmit a downlink signal. The BS may transmit the downlink signal within a COT by a channel access procedure of step 1001 (or a previous channel access procedure). In response to transmission of the downlink signal by the BS, the terminal may transmit an uplink signal to the BS. The BS may receive the uplink signal. The uplink signal may explicitly include the result of transmission of the BS or may implicitly indicate the result of transmission of the BS.

The BS may obtain a result of transmission of the downlink signal from the uplink signal. The transmission result may include an ACK indicating successful reception of the downlink signal or a NACK (or a DTX as necessary) indicating transmission failure of the downlink signal. The BS may obtain the result of transmission of at least one of a reference data channel or a reference control channel in the reference slot. As described above, the transmission result may include at least one of an ACK, a NACK, or a DTX.

In step 1005, the BS determines a contention window for the next channel access. The BS may determine the contention window based on the result of the transmission of the downlink signal of the reference slot. The BS may determine the size of the contention window based on at least one of data channel(s), CBG(s), or control channel(s) included in the transmission result. The determination of the contention window may include increasing, decreasing, changing, or maintaining the contention window, i.e., contention window adjustment. Contention window adjustment may include a procedure of increasing the contention window of the BS in order to reduce a collision probability between the BS and another node, a procedure of decreasing the size of the contention window as the BS determines that there is no collision with another node, a procedure of maintaining the contention window since the size of the current contention window is a maximum value and thus cannot be increased any further, or a procedure of maintaining the size of the contention window if feedback on a downlink signal transmitted in a reference slot of a previous COT (e.g., 2 ms) is not received.

The BS may increase the size of the contention window to be larger than the size of the contention window for channel access of step 1001 based on the transmission result. For example, the BS may double the size of the contention window. The BS may change the size of the contention window to a value corresponding to the next size among predefined values. If the size of the current contention window is the maximum value, the BS may maintain the contention window.

The BS may decrease the size of the contention window to be smaller than the size of the contention window for channel access of step 1001 based on the transmission result.

For example, the BS may reduce the size of the contention window to a minimum value.

Although not illustrated in FIG. 10, the BS may perform the next channel access procedure. The BS may determine a sensing interval based on the contention window determined in step 1005. For example, if the size of the determined contention window is 31, the BS may select N within a range of [0, 31] and may determine a defer duration and a sensing interval corresponding to N. After performing the next channel access procedure, the BS may perform downlink transmission through the unlicensed band. The BS may perform the procedure of adjusting the contention window by repeating steps 1001 to 1005.

Figure 11A:
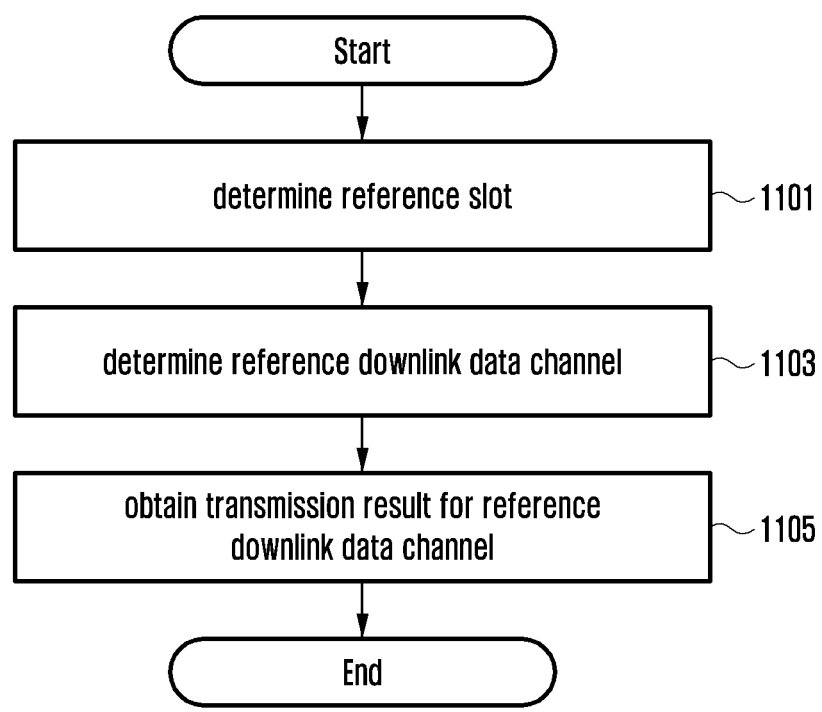
FIG. 11A is a flowchart illustrating an operation of a BS for downlink-data-channel-based contention window adjustment in a wireless communication system according to an embodiment.

FIG. 11A is a flowchart illustrating an operation of a BS for downlink data channel-contention window adjustment in a wireless communication system according to an embodiment. The operation illustrated in FIG. 11A may be a part of step 1003 of FIG. 10.

Referring to FIG. 11A, the BS determines a reference slot in step 1101. The BS may determine the reference slot for performing a current channel access procedure. The reference slot may be included in a COT acquired by a channel access procedure before the current channel access procedure. The BS may determine a first slot (or a starting slot) of most recent downlink transmission before the current channel access procedure as the reference slot. Downlink transmission may include at least one of a control channel including DCI or data according to the downlink scheduling result. The BS may determine the slot in which a first starting downlink control channel is located in most recent downlink transmission including the downlink control channel to be the reference slot. The BS may determine the slot in which a first starting downlink data channel is located in most recent downlink transmission including the downlink data channel to be the reference slot. A first slot of the most recent downlink transmission and the next slot may be determined as reference slots.

The BS may determine the reference slot differently according to whether or not the BS can receive the result of reception by the terminal of the downlink data channel in units of CBGs. For example, if the BS can receive a result of the reception by the terminal of the downlink data channel in units of CBGs, a slot in which a downlink data channel of which initial transmission starts in the most recent downlink transmission including the downlink data channel is located may be determined as the reference slot. Otherwise, a first slot of the most recent downlink transmission and the next slot may be determined as reference slots.

The BS may determine the reference slot differently according to whether or not the UE reception capability for the downlink data channel is at least unrelated to the time point at which the BS initiates channel access or not. For example, if the UE reception capability for one or more of the downlink data channels is unrelated to the time point at which the BS initiates channel access, e.g., if a first symbol of the downlink data channel that the BS desires to transmit to the terminal is a symbol simultaneous with or later than the time point at which the BS initiates channel access, the BS may determine a slot in which a downlink data channel of which initial transmission starts in the most recent downlink transmission including the downlink data channel is located as the reference slot. Otherwise, the BS may determine the first slot of the most recent downlink transmission and the next slot as reference slots.

In step 1103, the BS determines a reference downlink data channel. The reference downlink data channel may be a data channel related to a reference slot. The data channel may be a channel in which downlink traffic is transmitted, e.g., a PDSCH. The reference slot may include a plurality of symbols. The BS may determine all downlink data channels included in the reference slot as reference downlink data channels, or may determine the downlink data channel first transmitted to each terminal among downlink data channels included in the reference slot as the reference downlink data channel.

The BS may determine a downlink data channel initiated within a predetermined symbol from a reference point as the reference downlink data channel. For example, the reference point may be the time point at which the reference slot is initiated. The reference point may be the time point at which the CORESET ends, or may be configured by the BS. The predetermined symbol may be predefined or configured by the BS.

Alternatively, determining the reference downlink data channel or the reference downlink control channel in step 1103 may be omitted.

The BS performing the channel access procedure and adjusting the contention window in units of subbands may use the result of reception by the terminal of one or more of a downlink control channel or a downlink data channel transmitted through one or more frequency resources (one or more PRBs or one or more subcarriers) in the subband to adjust the contention window of each subband. If one downlink data channel is transmitted in frequency resources included in two subbands, the BS may use the result of reception by the terminal of the downlink data channel to adjust the contention window of the first subband and the contention window of the second subband. The BS may also use the result of reception by the terminal of the downlink data channel to adjust the contention window of the subband for transmitting the channel through larger frequency resources among subbands for transmitting the downlink data channel.

In step 1105, the BS obtains the result of transmission of the reference downlink data channel. The transmission result indicates whether the terminal successfully received and decoded downlink data transmitted through the reference downlink data channel. The transmission result may include an ACK or a NACK for downlink data. The BS may determine the result of transmission of the downlink data channel as a NACK even though the result of reception by the terminal is not received from the terminal. If feedback according to channel selection is NACK/DTX or any state, the BS may determine the result of transmission of the corresponding downlink data channel to be NACK. If a plurality of CWs are transmitted, the BS may independently obtain the result of transmission of each CW as the result of transmission of the downlink data channel.

Although not illustrated in FIG. 11A, the BS may determine the contention window based on the obtained transmission result. For example, if a NACK for the downlink data channel is greater than or equal to a threshold value (e.g., Z=80%), the BS may increase the size of the contention window. If the size of the current contention window is a maximum value, the BS may maintain the size of the contention window. If a NACK for the downlink data channel is smaller than the threshold value, the BS may configure the size of the contention window as a minimum value.

Figure 11B:
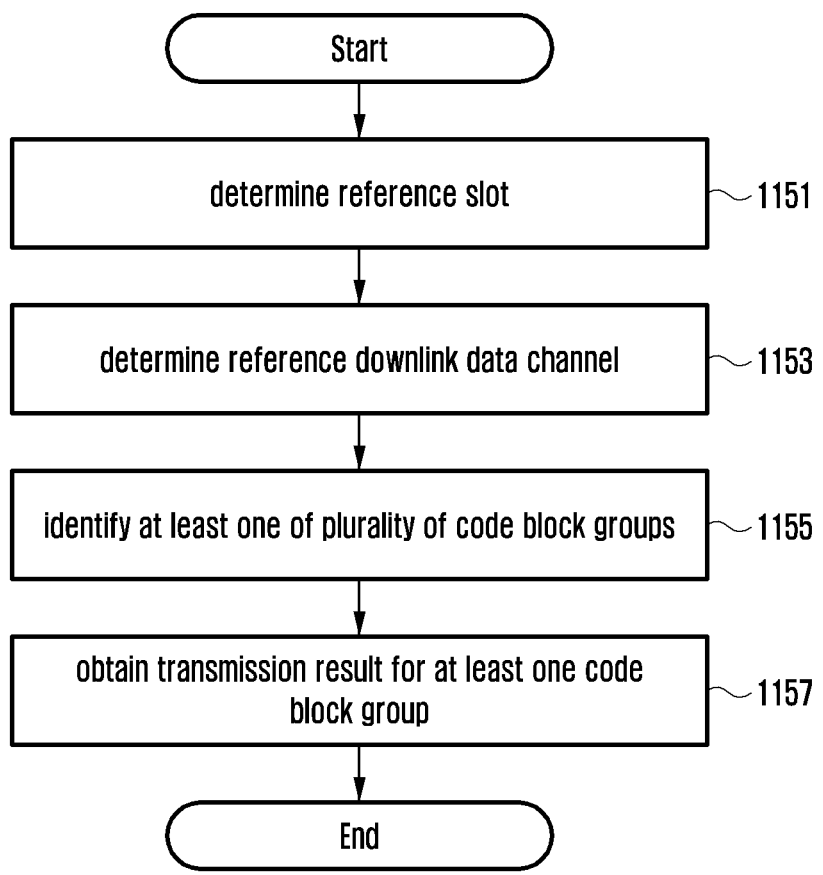
FIG. 11B is a flowchart illustrating an operation of a BS for code block group (CBG)-based contention window adjustment in a wireless communication system according to an embodiment.

FIG. 11B is a flowchart illustrating an operation of a BS for CBG-based contention window adjustment in a wireless communication system according to an embodiment. The operation illustrated in FIG. 11B may be a part of step 1003 of FIG. 10.

Referring to FIG. 11B, the BS determines a reference slot in step 1151. An operation for determining the reference slot corresponds to step 1101 of FIG. 11A, and thus a duplicate description is omitted.

In step 1153, the BS determines a reference downlink data channel. The operation for determining the reference downlink data channel corresponds to step 1103 of FIG. 11A, and a duplicate description is omitted.

In step 1155, the BS identifies at least one CBG among a plurality of CBGs. The reference downlink data channel may include a plurality of CBGs. The reference downlink data channel may be related to a TB. The TB may include one or more CBGs. A CBG may include one or more code blocks. For CBG-based transmission, the BS may insert a CBG transmission information (CBGTI) field into DCI including scheduling for the downlink data channel.

The BS may identify the CBG to be actually transmitted among a plurality of CBGs. The CBG to be transmitted may be a CBG to be retransmitted and may correspond to code blocks retransmitted to the terminal.

The BS may identify at least one CBG among CBGs to be transmitted. The BS may identify all of the transmitted CBG(s). The BS may identify K CBGs that are temporally earlier among transmitted CBG(s). The BS may identify K CBGs in an index order among transmitted CBG(s). The BS may identify a CBG initiated within X symbols from the time point at which transmission is initiated.

In step 1157, the BS obtains the result of transmission of at least one CBG. The BS may obtain the result of transmission of each CBG based on HARQ-ACK information received from the terminal. The BS may obtain the result of transmission of the transmitted CBG. The BS may obtain the result of transmission of at least one CBG identified in step 1155 based on the result of transmission of the transmitted CBG.

Although not illustrated in FIG. 11B, the BS may determine the contention window based on the obtained transmission result.

The BS may determine the result of transmission of the corresponding reference downlink data channel based on the result of transmission of at least one CBG. For example, if it is determined that Y % or more of at least one CBG is NACK, the BS may determine that a downlink data channel including the at least one CBG is NACK. The BS may determine the contention window based on the result of transmission of the downlink data channel.

The BS may determine the contention window based on a ratio of NACK of CBG(s) identified in respective downlink data channels. For example, if all reference downlink data channels configured in the BWP correspond to CBG-based transmission, the BS may increase the size of the contention window when the ratio of NACK of the actually transmitted CBGs to all CBGs configured in the BWP is Y % or more.

Figure 12:
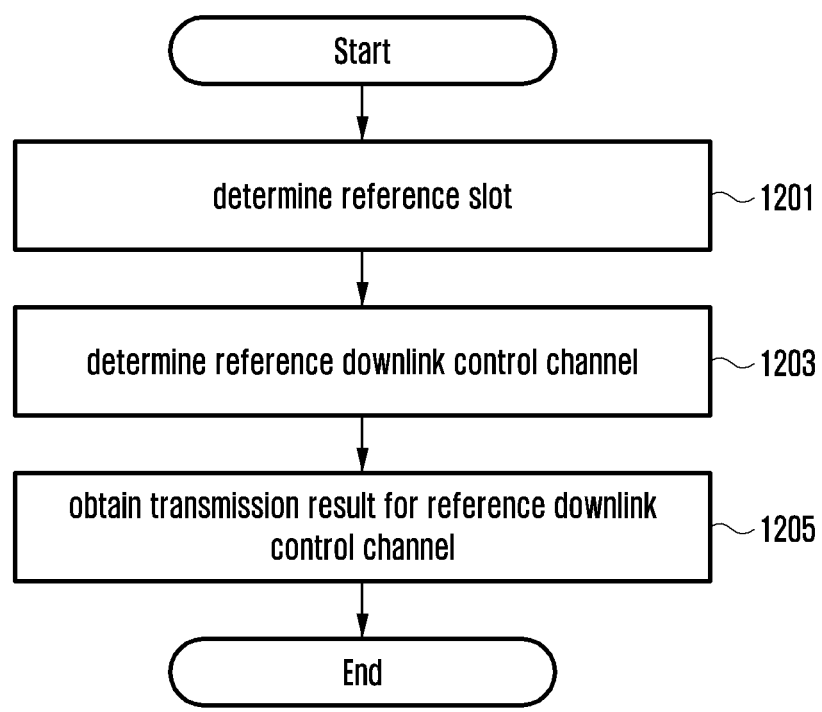
FIG. 12 is a flowchart illustrating an operation of a BS for downlink-control-channel-based contention window adjustment in a wireless communication system according to an embodiment.

FIG. 12 is a flowchart illustrating an operation of a BS to adjust a downlink-control-channel-based contention window in a wireless communication system according to an embodiment. The operation illustrated in FIG. 12 may be a part of step 1003 of FIG. 10.

Referring to FIG. 12, the BS determines a reference slot in step 1201. The operation for determining the reference slot corresponds to step 1101 of FIG. 11A, and thus a duplicate description is omitted.

In step 1203, the BS determines a reference downlink control channel. The reference downlink control channel may be related to the reference slot. The data channel may be for transmitting DCI, e.g., a PDCCH or a CORESET. The BS may determine all downlink control channel included in the reference slots as reference downlink control channels. The BS may determine the downlink control channel first transmitted to each terminal among downlink control channels included in the reference slot as the reference downlink control channel. The BS may determine a downlink control channel initiated within predetermined symbols from a reference point as the reference downlink control channel.

The BS may determine a downlink control channel for obtaining the result of reception by the terminal as a reference downlink control channel. The BS may determine a downlink control channel including information on downlink semi-persistent scheduling (SPS) configuration as a reference downlink control channel. The configuration may include activation, deactivation, or release. Alternatively, the BS may determine a downlink control channel including information on uplink SPS configuration as a reference downlink control channel. The configuration may include activation, deactivation, or release. The BS may determine a downlink control channel including scheduling information for uplink data as a reference downlink control channel.

The BS may determine one or more downlink control channels among downlink control channels for obtaining the result of reception by the terminal as reference downlink control channels. For example, the BS may determine the downlink control channel that is the temporally earliest among downlink control channels for obtaining the result of reception by the terminal as a reference downlink control channel.

The BS may determine a downlink control channel corresponding to transmission of an uplink signal, without LBT, as a reference downlink control channel. For example, if a switching gap between downlink and uplink is 16 us or smaller, the BS may determine a downlink control channel including allocation information of uplink data as a reference downlink control channel. The BS may determine a downlink control channel including DCI indicating a channel access procedure without LBT (e.g., LBT Category 1 of 3GPP) as a reference downlink control channel.

In step 1205, the BS obtains the result of transmission of the reference downlink control channel. The BS may obtain the transmission result from a response signal pertaining to the reference downlink control channel.

The BS may explicitly obtain the result of transmission of the reference downlink control channel. The BS may obtain the result of transmission of the reference downlink control channel through HARQ-ACK feedback on the reference downlink control channel or a logical channel ID (LCID) of a MAC CE.

The BS may implicitly obtain the result of transmission of the reference downlink control channel. The BS may obtain the result of transmission of the reference downlink control channel by receiving an uplink data channel (e.g., a PUSCH) according to an uplink grant included in the reference downlink control channel. If decoding of the uplink data channel fails, even though the uplink grant is transmitted, the BS may obtain the result of transmission of the reference downlink control channel.

Although not illustrated in FIG. 12, the BS may determine a contention window on the basis of the result of transmission of the reference downlink control channel.

Although FIG. 12 illustrates an operation based on a reference downlink control channel, the BS may determine a contention window in consideration of only a reference downlink control channel, and may also perform a contention window adjustment procedure in consideration of both a reference downlink control channel and a reference downlink data channel. For example, the BS may increase, decrease, or maintain the size of the contention window based on the result of transmission of all of at least one downlink control channel and at least one downlink data channel initiated in a first symbol from the time point at which downlink transmission starts.

Figure 13:
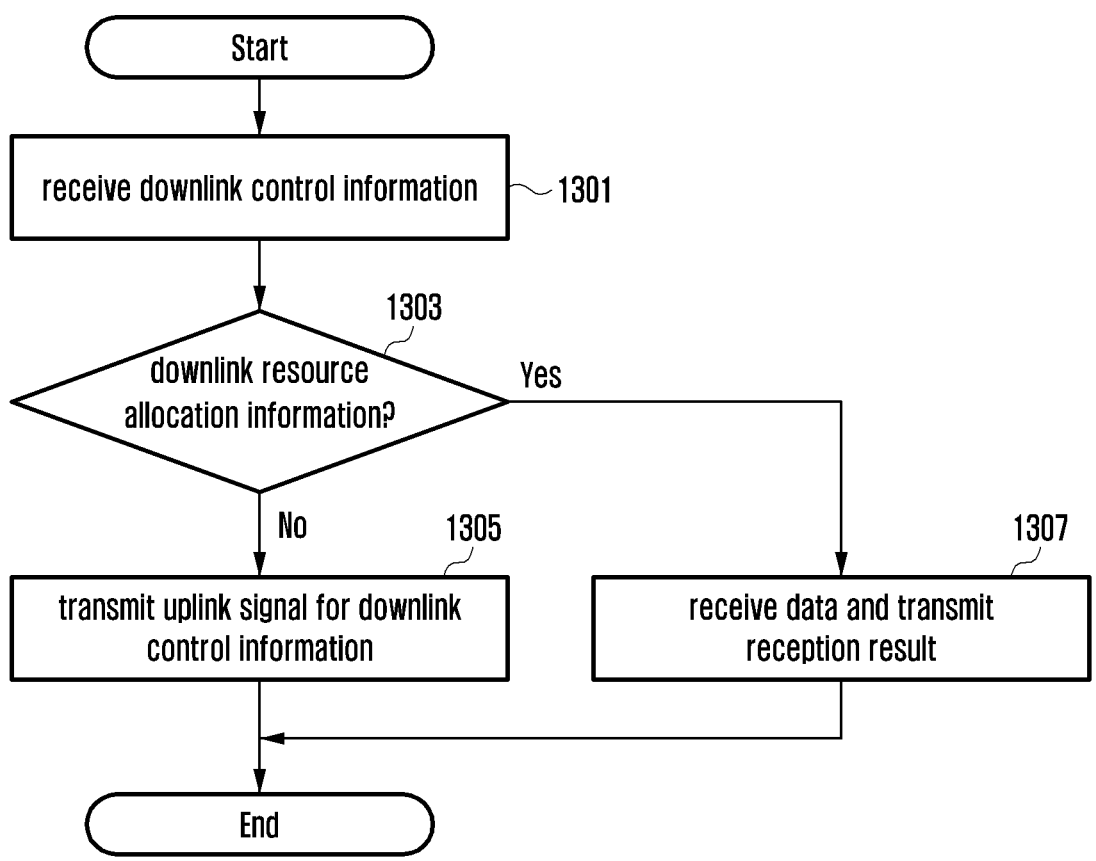
FIG. 13 is a flowchart illustrating an operation of a terminal for channel access in a wireless communication system according to an embodiment.

FIG. 13 is a flowchart illustrating a channel access procedure of a terminal in a wireless communication system according to an embodiment.

Referring to FIG. 13, the terminal receives DCI in step 1301.

The terminal may identify whether the BS accesses a channel. In the method by which the terminal identifies whether the BS accesses the channel, the terminal may identify whether the BS accesses the channel by determining whether a demodulation reference signal (DM-RS) transmitted with one or more of the downlink control channel or the downlink data channel that the BS transmits, is received. In another method by which the terminal identifies whether the BS accesses the channel, the terminal may identify whether the BS accesses the channel by determining whether DCI transmitted through the downlink control channel is received from the BS. For example, the terminal may identify whether the BS accesses the channel by receiving DCI including information indicating a COT and frequency resources of the BS. In another method by which the terminal identifies whether the BS accesses the channel, the terminal may identify whether the BS accesses the channel by receiving a predefined signal, which the terminal transmits when the BS starts transmitting a downlink signal, e.g., an initial signal (or a reservation signal).

DCI may be DCI that makes a request for providing feedback on the DCI of the terminal. The DCI may include downlink SPS configuration. The DCI may indicate activation, deactivation, or release of the downlink SPS. The terminal may be required to provide feedback in order to indicate completion of the downlink SPS configuration (e.g., HARQ-ACK). According to some embodiments, the DCI may include uplink SPS configuration. The DCI may indicate activation, deactivation, or release of the uplink SPS.

The terminal may be required to provide feedback in order to indicate completion of the uplink SPS configuration (e.g., a MAC CE). DCI including scheduling of downlink data and DCI including scheduling of uplink data may be received.

In step 1303, the terminal determines whether DCI includes downlink resource allocation information. If the DCI does not include downlink resource allocation information, the terminal transmits an uplink signal of DCI in step 1305. The uplink signal of the DCI may be HARQ-ACK information of the DCI. The HARQ-ACK information may include ACK or NACK. The uplink signal of the DCI may be a MAC CE. For example, the MAC CE of the uplink signal may indicate configured grant confirmation. The uplink signal of the DCI may include uplink data according to uplink scheduling included in the DCI.

If the DCI downlink control information includes downlink resource allocation information in step 1303, the terminal receives data from the BS and transmits the reception result to the BS in step 1307. The terminal may receive downlink data from the BS based on downlink resource allocation information. The terminal may successfully receive downlink data and decode the received data. If decoding is successful, the terminal may generate HARQ-ACK information including an ACK. If decoding fails, the terminal may generate HARQ-ACK information including a NACK. The terminal may transmit the reception result including HARQ-ACK information to the terminal.

The operation of the BS and the terminal to adjust the contention window based on at least one of the reference slot, the reference data channel, the reference CBG, or the reference control channel has been described with reference to FIGS. 10 to 13. Hereinafter, embodiments of adjusting the contention window through a resource region will be described with reference to FIGS. 14 to 15.

Figure 14:
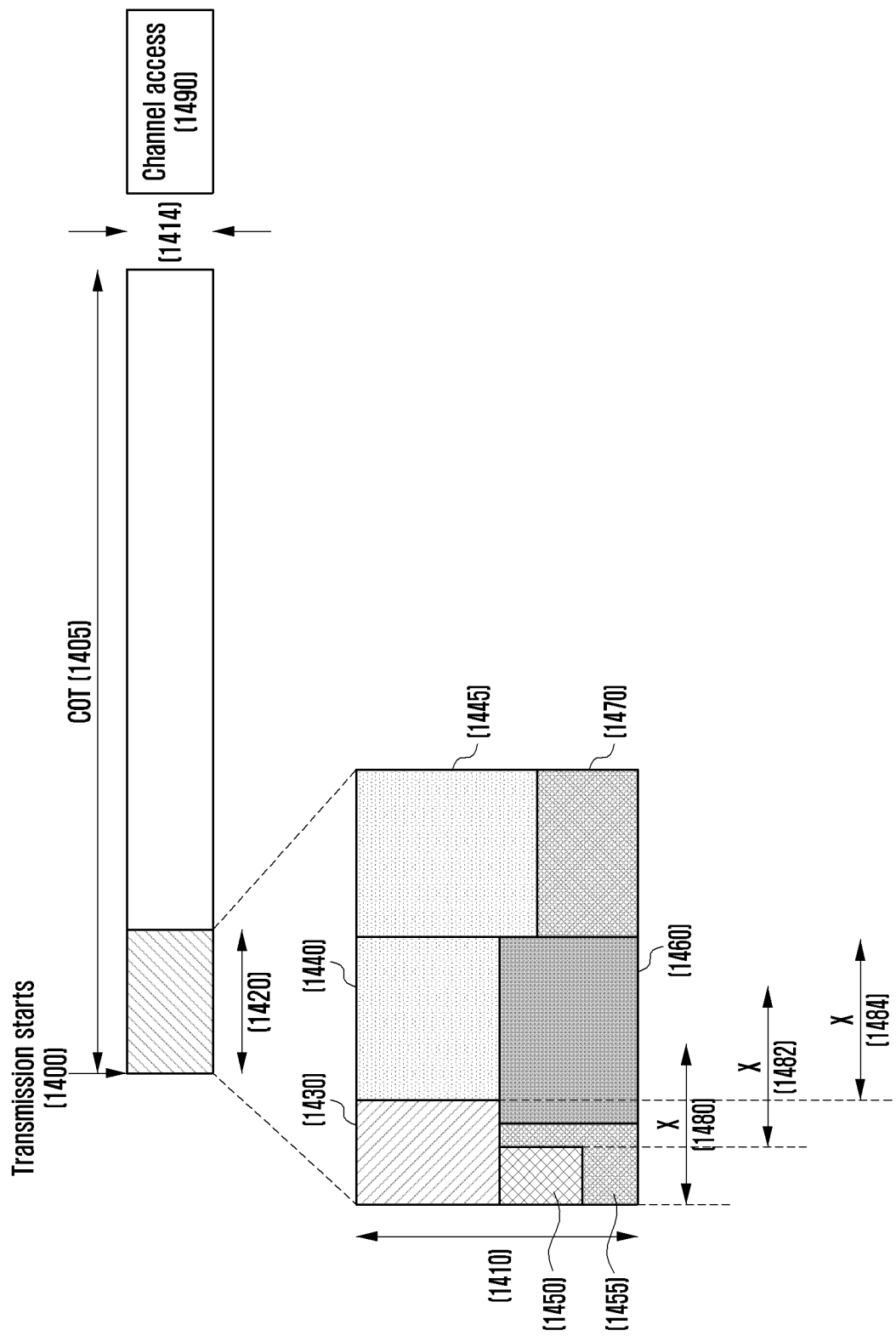
FIG. 14 illustrates a channel access procedure in a wireless communication system according to an embodiment.

FIG. 14 illustrates a channel access procedure in a wireless communication system according to an embodiment.

Referring to FIG. 14, the BS may perform a channel access procedure to communicate with the terminal through a BWP 1410 of a carrier. If the BWP 1410 is larger than 200 MHz, the BS may divide the BWP into one or more subbands and perform a channel access procedure for each subband. The size of subbands included in the BWP 1410 (or the number of PRBs) and start/end frequency domain information may vary depending on a bandwidth of the BWP 1410 and SCS.

The BS may determine that the channel is in an idle state through the channel access procedure. The BS may occupy and use the channel for a time 1404 within an MCOT according to a channel access priority class used for the channel access procedure.

Similar to FIG. 6, the BS may define one or more slots starting the COT as reference slots 1420 and change the size of the contention window based on the result of reception by the terminal of a downlink data channel transmitted in the reference slots.

In the 5G communication system, one or more downlink data channels may be transmitted to the terminal within the reference slots. For example, the BS may transmit PDSCHs 1440 and 1445 to a first terminal, transmit PDSCHs 1455 and 1470 to a second terminal, and transmit a PDSCH 1460 to a third terminal in a reference slot 1420. At least one of the terminals may transmit the result of reception of the downlink data channel to the BS in units of CBGs.

A reference slot for adjusting a contention window may be defined when the BS and the terminal communicate using an unlicensed band. A method of adjusting the contention window by the BS is provided when a plurality of downlink data channels are transmitted to at least one terminal in the reference slot. The BS may determine a reference data channel to consider when adjusting the contention window.

A method of adjusting the contention window by the BS is proposed when the terminal transmits the data reception result, distinguished for each CBG for at least one downlink data channel, in the reference slot. The BS may identify a CBG corresponding to the reception result determined for a change in the contention window.

A method of adjusting the contention window by the BS using not only a downlink data channel but also a downlink control channel in the reference slot is proposed. The BS may determine a reference control channel to consider when adjusting the contention window. A process of defining the reference slot with which to adjust the contention window may be omitted, and the process may be the same as adjusting the contention window using the reference slot, the reference control channel, or the data channel. For example, the BS may receive the result of reception by the terminal of the downlink data channel transmitted to the terminal in a slot starting a COT without defining the reference slot, and may adjust the contention window using the reception result. This is similar to defining the reference slot and the reference data channel and adjusting the contention window using the result of reception by the terminal of the reference data channel transmitted in the reference slot.

Data-Channel-Based Contention Window Adjustment

In an unlicensed band, a BS may adjust a contention window used for a channel access procedure. The BS may determine the contention window based on a result of reception by a terminal of a downlink data channel transmitted in a reference slot. A method of determining (changing or maintaining) the contention window when one or more downlink data channels are transmitted to the terminal in the reference slot is described below.

The BS may perform a channel access procedure to transmit a downlink signal in the unlicensed band. For example, as illustrated in FIG. 6, the channel access procedure may be performed to vary a size of the contention window. If it is determined that the unlicensed band is an idle channel, the BS may initiate the channel occupancy as indicated by reference numeral 1400 of FIG. 14. The BS may occupy the channel during an MCOT or a shorter time 1404 according to a channel access priority class used for the channel access procedure. The BS may determine a first slot of the COT 1404 (or a starting slot of the COT) as a reference slot 1420. The BS may determine the contention window for the next channel access procedure 1490 based on the result of reception by the terminal of the downlink data channel transmitted to the terminal in the reference slot 1420, i.e., the result of transmission of the downlink data channel. Determination of the contention window may refer to determination of the size of the contention window, which is the basis of a sensing interval (e.g., N slots) for determining channel occupancy by another node.

Determination of the contention window may include maintaining or changing (increasing or decreasing (e.g., initializing)) the size of the contention window. For example, if a ratio of NACKs to the (total number of) results of reception of downlink data channels transmitted to terminals in the reference slot 1420 is Z % or greater (e.g., Z=80%), the BS may increase the size of the contention window to that of the contention window having an immediately larger size. If the ratio of NACKs to the reception results is less than Z %, the BS may change the contention window to an initial contention window value or the contention window having the smallest size among the contention window sizes. The change in the contention window may be determined based on the result of transmission of the downlink data channel received from the terminal before a channel access procedure 1490 is initiated. If the BS does not receive the transmission result from the terminal, even though the BS instructs the terminal to transmit the result of transmission of the downlink data channel in the reference slot before the channel access procedure 1490 is initiated, the BS may determine or assume that the result of transmission of the terminal for the downlink data channel is a NACK and change the contention window. However, the description above in which the BS determines or assumes that the result of reception of the downlink data channel that has not been received before the channel access procedure is initiated is a NACK is only an example, and the embodiments of the disclosure are not limited thereto.

The BS may transmit the downlink data channel to one or more terminals in the reference slot. The BS may transmit a plurality of downlink data channels to a specific terminal in the reference slot 1420. The plurality of downlink data channels may be distinguished with regard to time or frequency and transmitted. The BS may transmit downlink data channels 1440, 1445, 1455, 1460, and 1470 to one or more terminals in the reference slot 1420. The BS may transmit downlink data channels 1440 and 1445 to a first terminal, transmit downlink data channels 1455 and 1470 to a second terminal, and transmit the downlink data channel 1460 to a third terminal. If a downlink data channel is transmitted to one or more terminals and one or more downlink data channels are transmitted to one or more terminals in the reference slot, the BS may determine the contention window through the following methods.

Method 1-1: determine all downlink data channel transmitted in the reference slot as reference downlink data channels and determine the contention window based on the result of reception by the terminal of the reference downlink data channels.

Method 1-2: determine the downlink data channel transmitted first (or earliest) for each terminal among all downlink data channel transmitted in the reference slot as a reference downlink data channel and determine the contention window based on the result of reception by the terminal of the reference downlink data channel.

Method 1-3: determine a downlink data channel of which transmission starts within X symbols after the BS accesses a channel among all downlink data channels transmitted in the reference slot as a reference downlink data channel and determine the contention window based on the result of reception by the terminal of the reference downlink data channel.

According to Method 1-1, the BS may determine all downlink data channels 1440, 1445, 1455, 1460, and 1470 of which transmission is initiated in the reference slot 1420 as reference downlink data channels. The BS may change the contention window on the basis of the result of reception by the terminal of the reference downlink data channels. The reference slot including the downlink data channel that is first transmitted after the BS initiates channel access has a high probability of a transmission collision with other devices in the unlicensed band channel. Accordingly, the BS may change the contention window based on all downlink data channels transmitted in the reference slot. In this case, the reference data channel used to adjust the contention window may be any downlink data channel transmitted in the reference slot.

According to Method 1-2, the BS may determine a downlink data channel of which first (or earliest) transmission for each terminal is initiated among all downlink data channels 1440, 1445, 1455, 1460, and 1470 of which transmission is initiated in the reference slot 1420 as a reference downlink data channel. The BS may change the contention window based on the result of reception by the terminal of the reference downlink data channel. The BS may transmit the downlink data channels 1440 and 1445 to a first terminal, transmit the downlink data channels 1455 and 1470 to a second terminal, and transmit the downlink data channel 1460 to a third terminal in the reference slot 1420. At this time, since the downlink data channel which is first (earliest) transmitted to each terminal is the reference downlink data channel, a data channel 1404 of the first terminal, a data channel 1055 of the second terminal, and a data channel 1060 of the third terminal may be determined as the reference downlink data channels. The BS may determine to change the contention window based on the result of reception by the terminal of the reference downlink data channel.

The downlink data channel that is first transmitted after the BS initiates channel access has a high probability of transmission collision with other devices in the unlicensed band channel. Accordingly, the BS may change the contention window based on the downlink data channel that is first transmitted to each terminal in the unlicensed band among all downlink data channels transmitted in the reference slot.

Compared to Method 1-1, the contention window may be more efficiently changed in Method 1-2 because the downlink data channel having the highest probability of transmission collision with other devices in the unlicensed band channel is considered. The reference data channel used to adjust the contention window may be a first downlink data channel of each terminal transmitted in the reference slot.

According to Method 1-3, the BS may determine a downlink data channel of which transmission starts within X symbols 1480 after the channel access initiation 1400 of the BS, among all downlink data channels 1440, 1445, 1455, 1460, and 1470 of which transmission is initiated in the reference slot 1420 as a reference downlink data channel. The BS may change the contention window based on the result of reception by the terminal of the reference downlink data channels. X may be predefined between the BS and the terminal. For example, X may be 1. X may be configured in the terminal by the BS through a higher-layer signal. For example, X may be one of 1 or 2, and may be configured through RRC signaling. X may be predefined according to a channel access priority class of the BS. For example, as the MCOT of the BS is longer, i.e., as a channel access priority class (p) is larger, X may be defined to be larger. As the MCOT is longer, the BS may determine a larger number of downlink data channels to be reference downlink data channels.

In Method 1-3, if X is 1, a downlink data channel of which transmission is initiated in a first symbol, among all downlink data channels 1440, 1445, 1455, 1460, and 1470 of which transmission is initiated in the reference slot 1420, may be a reference downlink data channel. The first symbol may be a first symbol of the reference slot 1420 or a first symbol among symbols for transmitting downlink data channels after the BS initiates channel occupancy. Alternatively, the first symbol may be a first symbol for transmitting downlink control channels after the BS initiates channel occupancy. If the system corresponding to X=1 is the first symbol for transmitting the downlink data channel after the BS initiates channel occupancy, the downlink data channel 1455 among all downlink data channels 1440, 1445, 1455, 1460, and 1470 of which transmission is initiated in the reference slot 1420 is the reference downlink data channel.

As another example, if X is 3, it is assumed that the downlink data channels 1440 and 1445, among all downlink data channels 1440, 1445, 1455, 1460, and 1470 of which transmission is initiated in the reference slot 1420, start being transmitted within X=3 symbols. If X=3, the BS may determine downlink data channels of which transmission is initiated within X symbols after the channel access initiation 1400 of the BS, i.e., the downlink data channel 1440 of the first terminal and the downlink data channel 1455 of the second terminal as reference downlink data channels according to Method 1-3. The BS may determine to change the contention window based on the result of reception by the terminal of the reference downlink data channels. If a plurality of downlink data channels transmitted to a specific terminal are determined to be reference downlink data channels, the BS may determine a first downlink data channel (or a downlink data channel which is transmitted earliest) among the reference downlink data channels of the terminal as a reference downlink data channel. For example, if the downlink data channels 1440 and 1445 of the first terminal are determined as reference downlink data channels (X>3), the first downlink data channel 1440 (or the downlink data channel that is transmitted earliest) as the reference downlink data channel. The remaining downlink data channel 1445, except for the first downlink data channel 1440 (or the downlink data channel that is transmitted the earliest), among the downlink data channels included in the reference downlink data channels of the first terminal may not be included in the reference downlink data channels.

In Method 1-3, the downlink data channel of which transmission starts within X symbols 1480 based on a slot boundary of the reference slot 1420 (e.g., symbol index #0) or the starting time 1400 or symbol in which signal transmission is initiated after channel access of the BS is determined as the reference downlink data channel, but the disclosure is not limited thereto. For example, the BS may determine a downlink data channel of which transmission starts within X symbols 1480 after the CORESET last symbol of the reference slot 1420 as the reference downlink data channel.

If a plurality of CORESETs are included in the reference slot, the BS may identify a CORESET for determining the reference symbol. The BS may identify the CORESET having the shortest length among the plurality of CORESETs. That is, the reference symbol may be the last symbol of the CORESET having the shortest length among CORESETs configured in the reference slot 1420. The BS may apply the last symbol of the CORESET 1450 having the shortest length among CORESETs 1430 and 1450 configured in the reference slot 1420 as the reference symbol, as indicated by reference numeral 1482. By applying the last symbol of the CORESET having the shortest length as the reference symbol, there is an advantage of including the downlink data channel 1455 that is transmitted earliest after the BS initiates channel occupancy, in the reference downlink data channel.

The BS may identify the CORESET having the longest length among the plurality of CORESETs. That is, the reference symbol may be the last symbol of the CORESET 1430 having the longest length among CORESETs 1430 and 1450 configured in the reference slot 1420. The BS may apply the last symbol of the CORESET 1430 having the longest length among the CORESETs 1430 and 1450 configured in the reference slot 1420 as the reference symbol, as indicated by reference numeral 1484. By applying the last symbol of the CORESET having the longest length as the reference symbol, there is an advantage of including the downlink data channel transmitted through the entire transmission bandwidth among downlink data channels transmitted after channel occupancy is initiated in the reference downlink data channel.

CBG-Based Contention Window Adjustment

In an unlicensed band, a BS may adjust a contention window used for a channel access procedure. The BS may determine a reference data channel among downlink data channels transmitted in a reference slot. If the result of reception of one or more reference downlink data channels is received in units of CBGs, the BS may determine the contention window based on the result of reception of the CBGs. A method of determining (changing or maintaining) the contention window, when the result of transmission of the downlink signal is obtained in units of CBGs is described below.

The BS may perform a channel access procedure to transmit a downlink signal in the unlicensed band. As illustrated in FIG. 6, the channel access procedure may be performed to vary the size of the contention window. If it is determined that the unlicensed band is the idle channel, the BS may initiate the channel occupancy as indicated by reference numeral 1400 and occupy the channel during an MCOT defined according to a channel access priority class used for the channel access procedure or a shorter time 1404, as illustrated in FIG. 14. The BS may determine a first slot of the COT 1405 (or a starting slot of the COT) as a reference slot 1420. The BS may determine the contention window for the next channel access procedure 1490 based on the result of reception by the terminal of the downlink data channel transmitted to the terminal in the reference slot 1420.

Determination of the contention window may refer to determination of the size of the contention window, which is the basis of a sensing interval (for example, N slots) for determining channel occupancy by another node. Determination of the contention window may include maintaining or changing (increasing or decreasing (e.g., initializing)) the size of the contention window. If the ratio of NACKs to the results of reception of downlink data channels transmitted to terminals in the reference slot 1420 is Z % or higher (e.g., Z=80%), the BS may increase the size of the contention window to that of the contention window having an immediately larger size. If the ratio of NACKs to the reception results is lower than Z %, the BS may change the contention window to an initial contention window value or a contention window having the smallest size among the contention window sizes. The change in the contention window may be determined based on the result of reception of the downlink data channel from the terminal before a channel access procedure 1490 is initiated. If the BS does not receive the reception result from the terminal even though the BS instructs the terminal to transmit the result of reception of the downlink data channel transmitted in the reference slot before the channel access procedure 1490 is initiated, the BS may determine or assume that the result of reception by the terminal of the downlink data channel is a NACK and change the contention window. As described above, the description in which the BS determines or assumes that the result of reception of the downlink data channel, which has not been received before the channel access procedure is initiated, to be a NACK is only an example, and the disclosure is not limited thereto.

The BS may transmit the downlink data channel to one or more terminals in the reference slot. The BS may transmit a plurality of downlink data channels to a specific terminal in the reference slot 1420. The plurality of downlink data channels may be distinguished with regard to time and frequency and transmitted. For example, as illustrated in FIG. 14, the BS may transmit downlink data channels 1440, 1445, 1455, 1460, and 1470 to one or more terminals in the reference slot 1420 The BS may transmit downlink data channels 1440 and 1445 to a first terminal, transmit downlink data channels 1455 and 1470 to a second terminal, and transmit the downlink data channel 1460 to a third terminal.

If a downlink data channel is transmitted to one or more terminals and one or more downlink data channels are transmitted to one or more terminals in the reference slot, the BS may determine a reference downlink data channel through Methods 1-1 through 1-3. The BS may determine the contention window through the result of reception by the terminal of the reference downlink data channel. The BS may receive the reception result for one or more reference downlink data channels among the reference downlink data channels in units of CBGs. The BS may determine whether the result of reception of the reference downlink data channel is an ACK or a NACK in consideration of the transmission result in units of CBGs through the following method and change the contention window according thereto.

Method 2-1: determine that the result of reception of the reference downlink data channel is a NACK if Y % or more of the results of reception of the reference downlink data channels for all CBGs is a NACK Method 2-2: determine that the result of reception of the reference downlink data channel is a NACK, if K CBGs, which are sequential from the beginning, for all CBGs of the reference downlink data channels (or K CBGs in an increasing order of indexes from a smallest index among CBGs transmitted in the reference slot) are NACKs Method 2-3: determine that the result of reception of the reference downlink data channel is a NACK, if Y % of the reception result for CBG(s) of which transmission is initiated within X symbols among the reception result for all CBGs of the reference downlink data channels is a NACK If the result of reception of one or more of the reference downlink data channels is received in units of CBGs, the BS may determine the result of transmission of the reference data channels in consideration of the reception result in units of CBGs. Hereinafter, methods of determining the result of transmission of the reference downlink data channels are described in more detail below with reference to FIG. 15.

Figure 15:
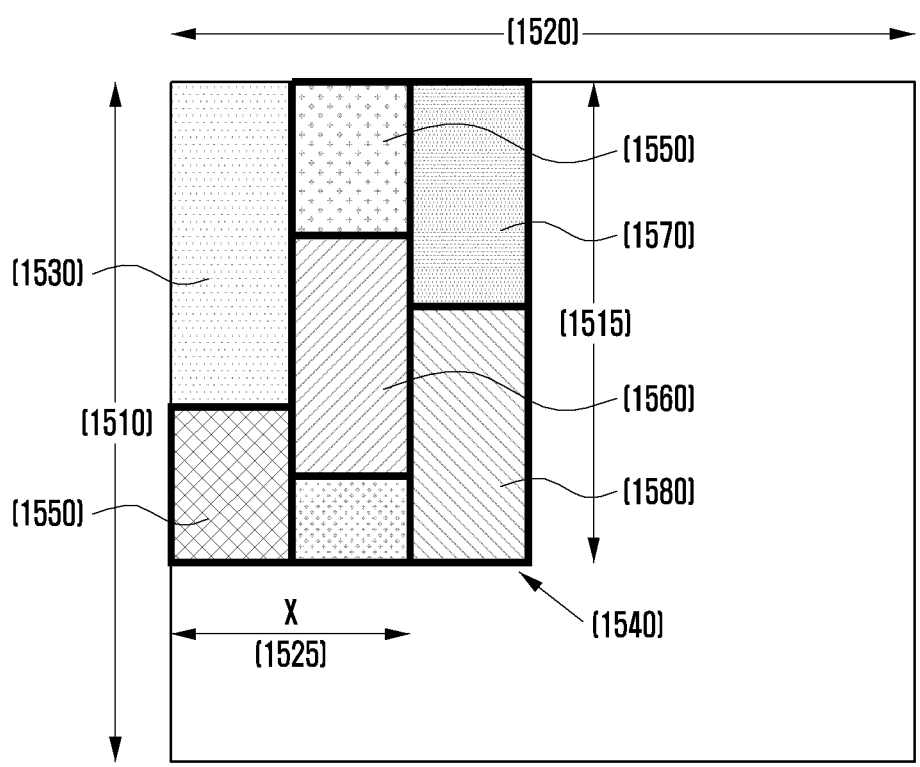
FIG. 15 illustrates a CBG-based channel access procedure in a wireless communication system according to an embodiment.

FIG. 15 illustrates a CBG-based channel access procedure in a wireless communication system according to an embodiment.

Referring to FIG. 15, the vertical axis is the frequency domain and indicates a BWP or a carrier bandwidth 1510, and the horizontal axis is the time domain and indicates a reference slot 1520. The reference slot 1520 may be determined using one or more of Methods 1-1 to 1-3. A resource region 1530 indicates a CORESET. The reference slot 1520 may include one reference downlink data channel 1540 of the reference downlink data channel(s). The terminal may transmit the result of reception of the reference downlink data channel 1450 in units of CBGs 1550, 1560, 1563, 1566, 1570, and 1580. If the reception result for at least one of the code blocks belonging to the CBG is a NACK, the result of reception of the CBG is a NACK.

According to Method 2-1, the BS may receive the result of reception of the reference downlink data channel 1540 in units of CBGs from the terminal. If Y % or more of the reception result for all CBGs 1550, 1560, 1570, and 1580 transmitted in the reference slot 1520 among the reception result in units of CBGs received from the terminal are NACKs, the BS may determine that the result of reception of the reference downlink data channel 1540 to be a NACK. If Y=100% and the reception results for all CBGs 1550, 1560, 1570, and 1580 transmitted in the reference slot 1520 among the reception result in units of CBGs received from the terminal are NACKs, the BS may determine that the result of reception of the reference downlink data channel 1540 is a NACK. If the reception result for at least one CBG among the reception results for all CBGs 1550, 1560, 1570, and 1580 transmitted in the reference slot 1520 in the reception result in units of CBGs received from the terminal is an ACK, the BS may determine that the result of reception of the reference downlink data channel 1540 to be an ACK.

According to Method 2-2, the BS may receive the result of reception of the reference downlink data channel 1540 in units of CBGs from the terminal. The BS may determine whether the reference data channel is an ACK or a NACK based on the reception results for K CBG(s) among the results of reception by the terminal of CBGs of the reference downlink data channel 1540 transmitted to the terminal in the reference slot 1520. The BS may identify at least one code block (K CBGs) among a plurality of CBGs. The BS may identify K CBG(s) sequentially from the earliest time point among a plurality of CBGs. The BS may identify K CBG(s) sequentially in an increasing order of indexes from the small index among a plurality of CBGs. If Y % or more of the reception results for K CBG(s) are NACKs, the BS may determine that the result of reception of the reference downlink data channel 1540 is a NACK. For example, if K=1 and Y=100% and if the result of receptions by the terminal of a first CBG 1550 among the reception results for all CBGs transmitted in the reference slot 1520 in the reception result in units of CBGs received from the terminal are NACKs, the BS may determine that the result of reception by the terminal of the downlink data channel 1540 is a NACK. If K=2 and Y=50% and if the results of reception by the terminal of one or more of the first CBG 1550 and the second CBG 1560 among the reception results for all CBGs transmitted in the reference slot 1520 in the reception result in units of CBGs received from the terminal are NACKs, the BS may determine that the result of reception by the terminal of the downlink data channel 1540 is a NACK.

At least one of the number (K) of CBGs, which is the reference of determination of the reference data channel or the probability value (Y), may be determined in various ways. A parameter of at least one of K or Y may be configured in the terminal by the BS. For example, the BS may configure K or Y in the terminal through a higher-layer signal.

At least one of K or Y may be indicated or predefined by the BS without any separate configuration. The case in which the parameter of at least one of K or Y is preconfigured without any additional configuration may be, e.g., the predefined case in which K=1 and Y=100%, or may be the same as the case in which the operation which is the same as K=1 and Y=100% is predefined. If the reception result for the first CBG 1550 among the reception result for all CBGs transmitted in the reference slot 1520 in the reception result in units of CBGs received from the terminal is a NACK, the BS may determine that the result of reception of the reference downlink data channel 1540 is a NACK.

K may be implicitly defined or changed according to a frequency axis resource allocation region of the reference downlink data channel. For example, the BS may change the contention window using the reference slot in order to correctly reflect an unlicensed band use collision with other devices. For the reference downlink data channel to determine the contention window within the reference slot, the BS may need the result of reception by the terminal of the entire area of the frequency band to which the reference downlink data channel is allocated. Accordingly, the BS may determine the result of reception of the reference downlink data channel 1540 based on Y and the reception results for CBGs for obtaining the reception result for the entire frequency axis resources allocated to the reference downlink data channel, e.g., the CBGs 1550, 1560, and 1570 for obtaining the result of reception by the terminal of the frequency band 1515 to which the reference data channel is allocated in FIG. 15 among the reference downlink data channels received from the terminal.

According to Method 2-3, the BS may receive the result of reception of the reference downlink data channel 1540 in units of CBGs. The BS may determine the result of reception of the reference downlink data channel 1540 using the reception result(s) for CBG(s) of which transmission is initiated within X symbols 1525 from the beginning of the reference downlink data channel among the result of reception of CBGs by the terminal for the reference downlink data channel 1540 actually transmitted to the terminal in the reference slot 1520. For example, the BS may determine the result of reception of the reference downlink data channel 1540 using the reception results for the CBGs 1550, 1560, and 1570 of which transmission is initiated within X symbols 1525 among the reception result in units of CBGs of the reference downlink data channel 1540 received from the terminal. If Y=100% and all of the reception results for the CBGs 1550, 1560, and 1570 are NACK, the BS may determine that the result of reception of the reference downlink data channel 1540 is a NACK. If the reception result for at least one CBG among the reception results for CBGs 1550, 1560, and 1570 is an ACK, the BS may determine that the result of reception of the reference downlink data channel 1540 is an ACK. X and Y are only examples and are not limited to the above values.

At least one of the location (X) of the symbol which is the reference of determination of the reference data channel or the probability value (Y) may be determined in various ways. A parameter of at least one of X or Y may be configured in the terminal by the BS. For example, the BS may configure X or Y in the terminal through a higher-layer signal. The BS may configure X or Y in the terminal through a higher-layer signal.

At least one of X or Y may be indicated or predefined by the BS without any separate configuration. The case in which the parameter of at least one of X or Y is preconfigured without any additional configuration may be, e.g., the predefined case in which X=1 and Y=100% or may be the same as the case in which the operation that is the same as X=1 and Y=100% is predefined.

As described above, when the contention window is determined, the reception result for the CBG used for determining the result of transmission of the reference data channel is the reception result for the CBG transmitted by the BS in the reference slot. The BS may indicate the transmitted CBG among CBGs through a CBGTI field of DCI for scheduling the downlink data channel transmitted in the reference slot. The terminal may identify the actually retransmitted CBG among the CBGs through the CBGTI of DCI. In order to maintain a HARQ-ACK codebook having the same size between the BS and the terminal, the terminal may also transmit the reception result for CBGs other than the transmitted CBG. It may be preferable to change the contention window using only the reception result for the CBG transmitted in the reference slot. Accordingly, the BS may determine the result of transmission of the reference data channel based on the reception result for the transmitted CBG. For example, the CBGTI may consist of 6 bits and indicate 010010. Among the transmitted CBGs, a first CBG or the CBG having the smallest CBG index may be the temporally first CBG or the CBG having the smallest CBG index (e.g., a second CBG) among the CBGs (e.g., a second CBG and a fifth CBG) actually transmitted in the reference slot.

Control-Channel-Based Contention Window Adjustment

In an unlicensed band, a BS may determine a contention window used for a channel access procedure based on a result of reception by a terminal of at least one of a downlink data channel or a downlink control channel transmitted in the reference slot. A method using a downlink control channel is described as the reference for determining the contention window of the BS proposed by various embodiments of the disclosure. A method of determining (changing or maintaining) the contention window when one or more downlink data channels are transmitted to the terminal in the reference slot is described below.

A reference for adjusting the contention window of the BS determined through various embodiments of the disclosure may be a channel of which transmission is initiated in an $X^{th}$ symbol from a first symbol transmitted after the BS initiates channel access.

Referring again to FIG. 14, the BS may determine (change or maintain) the contention window in consideration of the downlink control channels 1430 and 1450 and the downlink data channels 1440, 1455, and 1460 of which transmission is initiated within X 1480 among the downlink control channels 1430 and 1450 and the downlink data channels 1440, 1445, 1455, 1460, and 1470 in the reference slot. The downlink control channels 1430 and 1450 may be referred to as reference downlink control channels in the contention window adjustment procedure. The example is based on the case in which both the reference downlink data channel and the reference downlink control channel are considered, but the disclosure is not limited thereto. A method of determining the contention window in consideration only of the reference downlink control channel, without the downlink data channel, may also be understood as an embodiment. The BS may determine the reference downlink control channel in a manner similar to that of the reference data channel of Methods 1-1 to 1-3. For example, the BS may determine all downlink control channels included in the reference slot as reference downlink control channels. The BS may determine a first reference downlink control channel of each terminal as the reference downlink control channel. The BS may determine a downlink control channel initiated within X symbols from the time point at which downlink transmission is performed as the reference downlink control channel.

In general, the terminal does not transmit the result of reception of the downlink control channel, unlike the downlink data channel. Accordingly, the BS should obtain only the result of transmission of the downlink control channel. The BS may obtain the result of transmission of the downlink control channel and information indicating the transmission result in the contention window adjustment procedure, and a method of determining the contention window using the obtained information may be required. To this end, it is required to identify a downlink control channel that can be determined as the reference downlink control channel among the downlink control channels. That is, a downlink control channel for obtaining the result of reception of the downlink control channel, information indicating correct reception of the downlink control channel, or information corresponding to reception of the downlink control channel may be used as the reference downlink control channel among the downlink control channels. One or more of the downlink control channels may be reference downlink control channels.

The BS may determine a downlink control channel of which the transmission result can be obtained as the reference downlink control channel. If the reference slot includes a plurality of downlink control channels, the BS may determine the reference downlink control channel in a manner similar to Methods 1-1, 1-2, and 1-3. Although an example of a downlink control channel of which the transmission result can be obtained is described below, the disclosure is not limited to the following examples. For example, a downlink control channel of which the transmission result can be obtained may be considered as the reference downlink control channel for adjusting the contention window.

Example 3-1: Downlink Control Channel for Transmitting DCI Indicating Deactivation or Release of Reception Configuration of an Activated Semi-Persistent Downlink Data Channel in which DCI that is CRC Scrambled with an SPS-RNTI or a Configured Scheduling (CS)-RNTI is Configured According to Example 3-1, reception of a semi-persistent downlink data channel may be configured in the terminal. The terminal having activated SPS may receive DCI CRC scrambled with an SPS-RNTI or a CS-RNTI. The DCI may indicate deactivation or release of reception configuration of the activated semi-persistent downlink data channel. The terminal may transmit HARQ-ACK information to the BS in order to inform the BS of correct reception of the DCI, i.e., in order to inform the BS of completion of release of the reception configuration of the activated semi-persistent downlink data channel by an indication of the BS. That is, the BS may use a downlink control channel, which is transmitted to the terminal in the reference slot and of which the reception result, i.e., HARQ-ACK information, in Example 3-1 can be received from the terminal, as the reference downlink control channel.

For a downlink control channel transmitting DCI indicating activation of the reception configuration of the semi-persistent downlink data channel in which DCI that is CRC scrambled with an SPS-RNTI or a CS-RNTI is configured, the BS may use the downlink control channel including the DCI as the reference downlink control channel. The BS may consider the result of reception by the terminal of a first downlink data channel of the activated semi-persistent downlink data channel, i.e., HARQ-ACK information, as a response signal from the terminal for reception of the DCI. The BS may obtain the result of transmission of the downlink data channel. The BS may change the contention window on the basis of the transmission result.

Example 3-2: Downlink Control Channel for Transmitting DCI Indicating Activation, Deactivation, or Release of Transmission Configuration of a Semi-Persistent Uplink Data Channel in which DCI that is CRC Scrambled with an SPS-RNTI or a CS-RNTI is Configured According to Example 3-2, the terminal in which transmission of the semi-persistent uplink data channel is configured may activate the configuration of transmission of the semi-persistent uplink data channel through the DCI that is CRC scrambled with the SPS-RNTI or the CS-RNTI. Similarly, the terminal may deactivate or release the configuration of transmission of the activated semi-persistent uplink data channel through the DCI that is CRC scrambled with the SPS-RNTI or the CS-RNTI. Whether the DCI indicates activation of the configuration of transmission of the semi-persistent uplink data channel or DCI indicating deactivation or release thereof may be indicated by specific field information of the DCI. For example, if an NDI field is 0 and both an HARQ process number field and a redundancy version field value are 0, the DCI indicates activation of the configuration of transmission of the semi-persistent uplink data channel. If an NDI field is 0, both an HARQ process number field and a redundancy version field value are 0, and both a modulation and coding scheme field and a frequency resource allocation field are 1, the terminal may determine that the DCI indicates deactivation or release of the configuration of transmission of the semi-persistent uplink data channel. The terminal receiving the DCI indicating activation or release of the configuration of transmission of the semi-persistent uplink data channel may transmit information on a response to reception of the DCI in order to inform the BS of correct reception of the DCI. Specifically, in order to inform the BS of activation of the configuration of transmission of the semi-persistent uplink data channel or of completion of release of the configuration of transmission of the activated semi-persistent uplink data channel by the indication of the BS, the terminal may transmit information on the response to DCI reception to the BS, as in Example 3-1. The terminal may transmit the response information through a MAC CE information. More specifically, the terminal may transmit the information on the response to the DCI reception to the BS by transmitting 0 bitstreams to areas for a LCID (e.g., index 55) corresponding to configured grant configuration and SPS confirmation.

The response information may include the result of reception of the DCI by the terminal, i.e., the result of transmission of the BS for the downlink control channel. The BS may determine a downlink control channel, which is transmitted to the terminal in the reference slot and of which the reception result (e.g., MAC CE confirmation information or an uplink data channel for transmitting the MAC CE confirmation information in Example 3-2) can be received from the terminal, as the reference downlink control channel.

Example 3-3: Downlink Control Channel for Transmitting DCI (i.e. UL Grant) Indicating Configuration of Transmission of an Uplink Data Channel According to Example 3-3, the terminal receiving DCI for configuring uplink data channel transmission (e.g., if an NDI field of DCI, which is CRC scrambled with a C-RNTI, or DCI, which is CRC scrambled with an SPS-RNTI or a CS-RNTI, is 1) may transmit the uplink data channel in a time-frequency resource region configured by the DCI. If the terminal does not correctly receive the DCI, the terminal cannot transmit the uplink data channel. Accordingly, the BS may consider the uplink data channel transmitted by the terminal as response information of the terminal for DCI reception. The terminal may use information indicating whether the uplink data channel is received in order to determine the contention window. That is, the BS may use a downlink control channel, which is transmitted to the terminal in the reference slot and of which the reception result, i.e., the configured uplink data channel, can be received from the terminal, as the reference downlink control channel. The BS may use a downlink control channel including an uplink grant as the reference downlink control channel.

The terminal may perform a channel access procedure for an unlicensed band before transmission of an uplink data channel is initiated. The case in which the BS does not receive an uplink data channel configured in the terminal, when the terminal performs the channel access procedure for the unlicensed band, before initiating transmission of the uplink data channel, may occur due to at least one of failure in the channel access procedure by the terminal or failure in DCI reception by the terminal. However, the BS cannot identify whether failure in the uplink data channel is due to failure in channel occupancy by another node (i.e., failure due to the channel access procedure) or failure in decoding of DCI. When considering only whether the uplink data channel of the terminal is received, the result of transmission of the downlink control channel may include a collision with other devices in the reference slot and also the result of the channel access procedure of the terminal.

In order to minimize the problem, a BS according to an embodiment may more restrictively determine the reference downlink control channel. If the terminal can transmit the uplink data channel configured through the downlink control channel transmitted to the terminal in the reference slot without any LBT procedure, the BS may use the downlink control channel as the reference downlink control channel. For example, the terminal may transmit the downlink data channel without LBT if a specific field of DCI (i.e., an uplink grant) for configuring transmission of the uplink data channel, e.g., a channel access type indicator, indicates that the uplink signal can be transmitted without any LBT procedure (e.g., if the Type 3 channel access procedure is indicated). Transmission of the uplink data channel without any LBT procedure may refer to transmission of the uplink data channel without performing channel sensing in advance for access to the unlicensed band. If transmission of the configured uplink data channel is initiated and terminated within a COT obtained by the BS and an interval between transmission of the uplink data channel and transmission of the downlink signal of the BS is shorter than 16 us, the terminal may transmit the uplink signal without any separate LBT procedure for transmission of the uplink data channel.

If the terminal can transmit the uplink data channel without any LBT procedure but the BS does not receive the uplink data channel configured in the terminal, the BS may determine that the terminal has failed to receive the DCI and thus does not transmit the uplink data channel. Accordingly, if the terminal can transmit the uplink data channel without any LBT procedure in the channel access procedure, the BS may determine a downlink control channel related to the uplink data channel as the reference downlink control channel.

Even if the uplink data channel configured through the downlink control channel transmitted to the terminal in the reference slot is transmitted after the channel access procedure of the terminal (or if the Type 2 channel access procedure is used), the BS may use the downlink control channel as the reference downlink control channel. Because information indicating whether the BS collides with other devices in the reference slot and also the result of the channel access procedure of the terminal may be reflected in the change in the contention window, the BS may change the contention window in consideration of the downlink control channel when the terminal should transmit the uplink data channel after performing the channel access procedure (or regardless of whether or not the channel access procedure of the terminal is needed). The BS may determine a downlink control channel related to the uplink data channel after the channel access procedure (e.g., the Type 2 channel access procedure), corresponding to a shorter channel sensing interval, as the reference downlink control channel.

The BS may determine the contention window in consideration of the above various examples. For example, the BS may increase (or maintain (e.g., when the contention window is already maximized)) the contention window in at least one of the examples in which P1% of response signals of one or more downlink control channels transmitted to one or more terminals in the reference slot are not received, in which P2% of response signals are received but are NACKs, and in which P3% of response signals are not received, or are received but are NACKs. P1, P2, and P3 may be the same as or different from each other, or may further subdivided values may be used. At least one of P1, P2, or P3 may be a value defined between the BS and the terminal or that the BS can configure in the terminal through a higher-layer signal, and can be used after being declared to the terminal by the BS without any separate configuration or notification.

The BS may consider information indicating whether an uplink data channel configured or scheduled through DCI transmitted through the downlink control channel transmitted to the terminal in the reference slot is received as a response signal from the terminal for the downlink control channel, and may use the same as the reference downlink control channel. That is, if the BS does not receive P1% of uplink data channel transmission among uplink data channel transmission configured through DCI transmitted to one or more terminals through the downlink control channel in the reference slot, the BS may increase the contention window. If the terminal can transmit the uplink data channel without LBT and the BS receives at least one uplink data channel in transmission of the uplink data channels configured through DCI transmitted to one or more terminals through the downlink control channel in the reference slot, the BS may initialize the contention window. This may be the same as P1=100%. If the terminal can transmit the uplink data channel through the Type 2 channel access procedure and the BS receives P1% or more of the uplink data channels in transmission of the uplink data channels configured through DCI transmitted to one or more terminals through the downlink control channel in the reference slot, the BS may initialize the contention window. If the BS does not receive P1% or more of the uplink data channels, the BS may increase the contention window.

The BS may determine whether to change the contention window in consideration of the examples independently or in consideration of a combination of two or more examples. For example, the BS may determine whether to change the contention window based on C1%, C2%, and C3% of response signals for Case 1, Case 2, and Case 3, respectively, or based on C % of all response signals in consideration of all of Example 3-1, Example 3-2, and Example 3-3. C, C1, C2, and C3 may be the same as or different from each other, and may have further subdivided values according to the various embodiments and examples. At least one of C, C1, C2, or C3 may be a value predefined between the BS and the terminal or configured in the terminal by the BS through a higher-layer signal, and may be used after being declared to the terminal by the BS without any separate configuration or notification.

The BS may determine the contention window in consideration of both the reference downlink control channel and the reference downlink data channel. The BS may perform the determination according to at least one of the following methods.

Method A: the BS increases the contention window when at least one reference of the following references is satisfied.
  Reference 1-A: no response signal for the reference downlink control channel is received from the terminal or response signals are received and are NACKs
  Reference 2-A: D % of response signals of the terminal for the reference downlink data channel are NACKs or are considered as NACKs If none of the references are satisfied, the BS may change the contention window to an initial value. The increase in the contention window by the BS when only one of the references is satisfied is only one example, and the disclosure is not limited thereto. For example, the BS may increase the contention window only when all of the references are satisfied.

Method B: the BS increases the contention window when Reference 3-B among the following references is satisfied.
  Reference 1-B: no response signal for the reference downlink control channel is received from the terminal or response signals are received and a proportion of NACKs thereof is C2%
  Reference 2-B: response signals of the terminal for the reference downlink data channel are NACKs or a proportion of response signals that can be considered as NACKs is D2%
  Reference 3-B: a ratio of a minimum value (MIN(C2,D2)) or a maximum value (MAX(C2,D2)) to C2% and D2% in Reference 1-B and Reference 2-B is larger than K %

If condition 3 is not satisfied, the BS may change the contention window to an initial value.

Method C: the BS increases the contention window when Reference 3 among the following references is satisfied.
  Reference 1-C: no response signal for the reference downlink control channel is received from the terminal or response signals are received and the number of NACKs thereof is C3
  Reference 2-C: response signals of the terminal for the reference downlink data channel are NACKs or the number of response signals that can be considered as NACKs is D3
  Reference 3-C: a ratio of Reference 1-C and Reference 2-C to all response signals of the terminal in Reference 1-C and Reference 2-C, the number of (C3+D3)/all response signals being larger than K %

If Reference 3-C is not satisfied, the BS may change the contention window to an initial value. If a response signal from the terminal for the reference downlink control channel is HARQ-ACK information, the BS may determine whether Condition 2-A, 2-B, or 2-C is satisfied based on the response signal.

Subband-Specific Contention Window Adjustment Method

In an unlicensed band, a BS may adjust a contention window used for a channel access procedure. The BS may determine the contention window based on one or more of results of reception by the terminal for a downlink control channel and a downlink data channel transmitted in the reference slot. A method by which the BS determines (changes or maintains) the contention window when the unlicensed band, the channel or carrier, or the BWP is larger than the size of the unlicensed band channel (e.g., 200 MHz when the unlicensed band is 5 GHz) will be described below.

Figure 16:
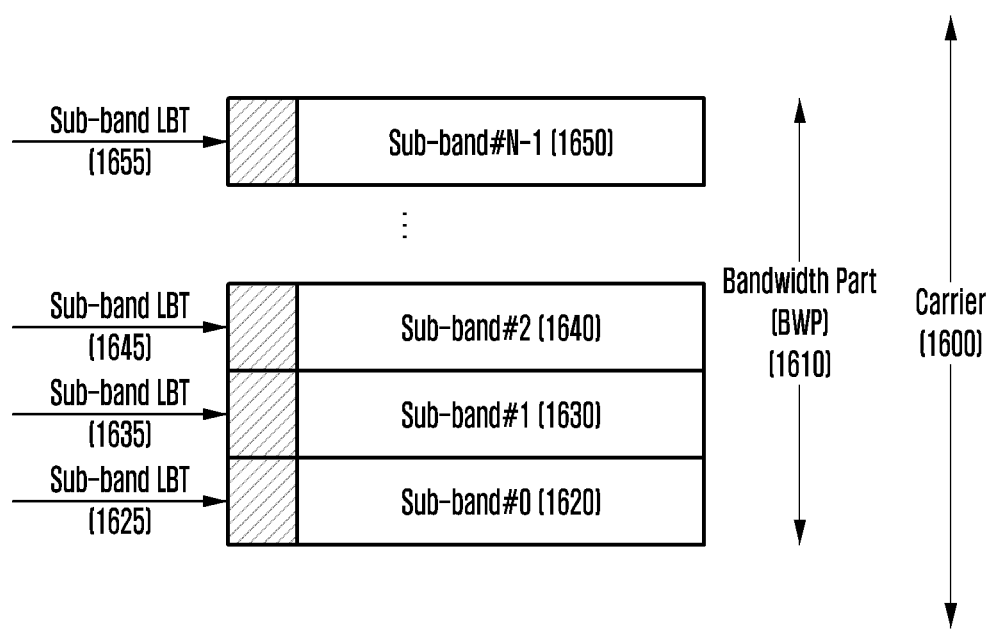
FIG. 16 illustrates subbands and a subband-based channel access procedure in a wireless communication system according to an embodiment.

FIG. 16 illustrates subbands and a subband-based channel access procedure in a wireless communication system according to an embodiment.

In a 7 GHz frequency band or a frequency band that is less than or equal to the 7 GHz frequency band being considered in the 5G communication system, one carrier may use a maximally 100 MHz frequency band. A terminal may perform communication with a base station using a part of a carrier frequency band (or BWP), and the BWP may be configured by the base station through a higher signal.

The base station and the terminal performing communication using an unlicensed band may perform a channel access procedure for an unlicensed band before transmitting a signal through the unlicensed band. The 5 GHz neighboring unlicensed band has been divided into channels in the unit of 20 MHz, and various communication devices may perform the channel access procedure with respect to the channels divided in the unit of 20 MHz, and they may perform communication using the unlicensed band. Accordingly, if the communication device intends to perform communication through the unlicensed band in the 5G communication system capable of using the broadband, it is preferable that the communication device performs the channel access procedure in the unit of 20 MHz. If the communication is performed through the unlicensed band while the base station and the terminal perform communication using a bandwidth part 1610 of a carrier 1600, the base station and the terminal may divide the bandwidth part 1610 into at least one subband, and perform the channel access procedure with respect to each subband.

Referring to FIG. 16, a BWP 1610 is divided into N subbands, and the channel access procedure is performed with respect to the divided subbands. In accordance with the bandwidth of the BWP 1610 and the subcarrier spacing, the size of the subbands constituting the BWP 1610 (or the number of PRBs) and start/end frequency domain information may be changed. Accordingly, a method is provided for configuring the size of the subbands constituting the BWP and the start/end frequency domain of the respective subbands in accordance with the size of the BWP and the subcarrier spacing. Accordingly, a method is provided for the terminal to properly receive the PDSCH or transmitting the PUSCH.

Figure 17:
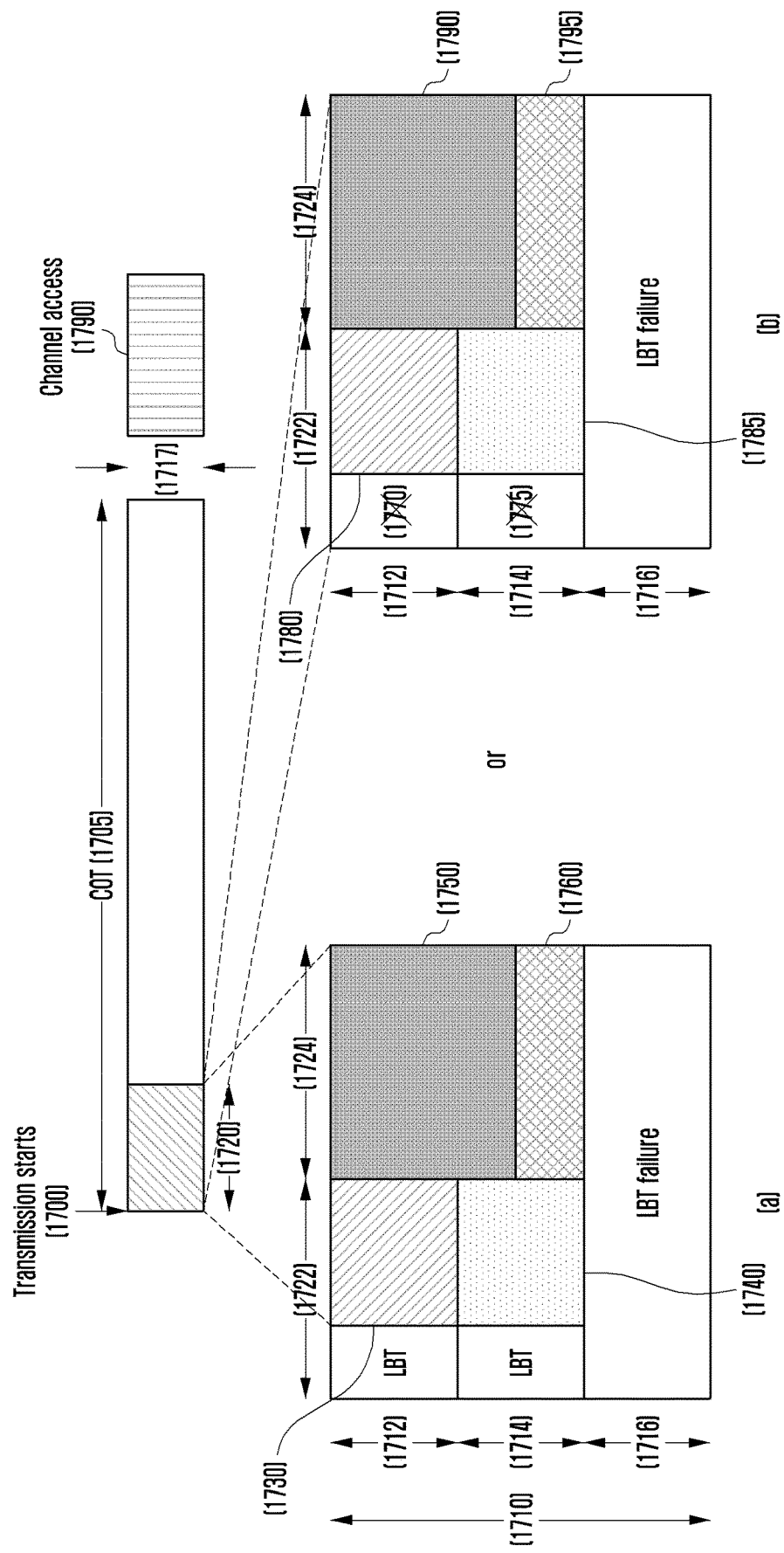
FIG. 17 illustrates a channel access procedure and a reference slot determination method in a wireless communication system according to an embodiment.

FIG. 17 illustrates a channel access procedure in a wireless communication system according to an embodiment.

Referring to FIG. 17, a BS may perform a channel access procedure to communicate with one or more terminals through a BWP 1710 of a carrier. If the BWP 1710 is larger than the size of an unlicensed band channel for communication (e.g., 200 MHz when the unlicensed band is 5 GHz), the BWP may be divided into one or more subbands (subband #0 1712, subband #1 1714, and subband #2 1716) and the channel access procedure may be performed for each subband. The size of the subband (or the number of PRBs) and start/end frequency domain information may be configured based on the defined unlicensed band channel. If the size of the unlicensed band channel is 20 MHz, the size of the subband may also be 20 MHz (or the number of PRBs corresponding thereto). The size of subbands included in the BWP 1710 (or the number of PRBs) and start/end frequency domain information may vary depending on the bandwidth of the BWP 1710 and SCS.

The BS may perform the channel access procedure for each subband to transmit a downlink signal in the unlicensed band. For example, as illustrated in FIG. 6, the channel access procedure may be performed to vary the size of the contention window. If it is determined that the unlicensed band is an idle channel, the BS may initiate the channel occupancy as indicated by reference numeral 1700 of FIG. 17. The BS may occupy the channel during an MCOT or a shorter time 1705 according to a channel access priority class used for the channel access procedure. the BS may determine the first slot of the COT 1705 (or a starting slot 1722 of the COT) and the next slot 1724 as reference slots 1720.

The BS may determine the contention window for the next channel access procedure 1790 based on the result of reception by the terminal of the downlink data channel transmitted to the terminal in the reference slot 1720, i.e., the result of transmission of the downlink data channel. Determination of the contention window may refer to determination of the size of the contention, window which is the basis of a sensing interval (e.g., N slots) for determining channel occupancy by another node. Determination of the contention window may include maintaining or changing (increasing or decreasing) the size of the contention window. If the ratio of NACKs to the results of reception of downlink data channels transmitted to terminals in the reference slot 1720 is Z % or greater (e.g., Z=80%), the BS may increase the size of the contention window to that of the contention window having an immediately larger size. If the ratio of NACKs to the reception results is lower than Z %, the BS may change the contention window to an initial contention window value or to a contention window having the smallest size among the contention window sizes. The change in the contention window may be determined based on the result of transmission of the downlink data channel received from the terminal before a channel access procedure 1490 is initiated.

If the BS does not receive the transmission result from the terminal, even though the BS instructs the terminal to transmit the result of transmission of the downlink data channel transmitted in the reference slot, before the channel access procedure 1790 is initiated, the BS may determine or assume that the result of transmission of the downlink data channel is a NACK, and change the contention window. If the BS instructs the terminal to transmit the result of transmission of the downlink data channel transmitted in the reference slot after the BS initiates the channel access procedure 1790, the BS may not use the result of transmission of the terminal for the downlink data channel for changing the contention window. In the above case, the BS may change the contention window based on determination and assumption that the result of transmission of the downlink data channel of the terminal is an NACK, and, later, may again change the contention window using the result of transmission of the downlink data channel received from the terminal.

If the BS does not receive the result of transmission of the downlink data channel transmitted in the reference slot within a time (or timer) defined in advance between UEs or configured through a higher-layer signal (or if the timer expires) and the BS instructs the terminal to perform transmission after the channel access procedure 1790 is initiated, the BS may determine and assume that the result of transmission of the downlink data channel is a NACK and change the contention window.

Although the BS determines or assumes that the result of reception of the downlink data channel that has not been received before the channel access procedure is initiated to be an NACK in the example above, the disclosure is not limited thereto.

In the channel access procedure for the BWP 1710, if the BS divides the BWP 1710 into one or more subbands 1712, 1714, and 1716 and performs the channel access procedure for each subband as illustrated in FIG. 17, the BS may allocate frequency resources of the downlink data channel only within each subband because the BS performs the channel access procedure for each subband and transmits a downlink signal only through some subbands 1712 and 1714 in the BWP 1710 according to the result of the channel access procedure. Accordingly, if the BS allocates frequency resources of the downlink data channel in the entire BWP 1710, data allocated to the subband 1716 that does not access the channel cannot be transmitted through puncturing according to the result of the channel access procedure, and thus the downlink data channel reception performance of the terminal deteriorates. Accordingly, the BS may allocate frequency resources of the downlink data channel only within each subband at least in the first slot of the COT (or the starting slot of the COT) or the reference slot, as illustrated in FIG. 17.

In FIG. 17, the BS may perform scheduling to allocate the downlink data channels 1730 and 1740 within the respective subbands 1712 and 1714 in the first slot of the COT 1705 (or the starting slot 1722 of the COT) and allocate the downlink data channels 1750 and 1760 within the entire subbands 1712 and 1714 determined to be in the idle state according to the result of the channel access procedure in other slots (slots after the first slot).

The BS may adjust the contention window through the following methods.

Method 4-1: adjust a contention window based on the entire subband or entire BWP According to Method 4-1, the BS may determine the contention window based on the result of reception by the terminal of downlink data channels (e.g., the downlink data channels 1730, 1740, 1750, and 1760) transmitted in the reference slot. Thereafter, because the subband-specific channel access procedure may overlap the description made through various embodiments of the disclosure, a description thereof will be omitted.

Method 4-2: adjust the contention window for each subband and perform the channel access procedure using the contention window for each subband.

According to Method 4-2, the BS may determine the contention window based on the result of reception by the terminal of the downlink data channel transmitted in the reference slot for each subband. The BS may determine the contention window for subband #0 1712 based on the result of reception by the terminal of the downlink data channels (e.g., the downlink data channels 1730 and 1750) transmitted in subband #0 1712 in the reference slot 1720, and determine the contention window for subband #1 1714 based on the result of reception by the terminal of the downlink data channels (e.g., the downlink data channels 1740, 1750, and 1760) transmitted in subband #1 1714 in the reference slot 1720. Among the downlink data channels, there may be a downlink data channel transmitted through a plurality of subbands such as the downlink data channel 1750. The BS may determine a subband for adjusting the contention window based on the result of reception by the terminal of the downlink data channel.

Method 4-2-1: the result of reception by the terminal of the downlink data channel transmitted through a plurality of subbands is used in one subband.

According to Method 4-2-1, among the downlink data channels, there may be a downlink data channel transmitted through a plurality of subbands such as the downlink data channel 1750. The result of reception by the terminal of the downlink data channel 1750 may be used to adjust the contention window in one of the subbands 1712 and 1714 in which the downlink data channel 1750 is transmitted. Because whether a collision with other nodes is generated in a subband is independent for each subband, it may be preferable to adjust the contention window based on the result of reception by the terminal of the downlink data channel in the subband to which the largest number of downlink data channels is allocated or in which the largest number of downlink data channels are transmitted among the subbands. The contention window adjustment may be applied to the subband (subband #0 of FIG. 17) having the larger number of frequency resources, e.g., the larger number of PRBs to which the downlink data channel is transmitted or allocated among the subbands 1712 and 1714 in which the downlink data channel 1750 is transmitted. Alternatively, the contention window adjustment may be applied to the subband (subband #0 of FIG. 17) having the larger amount of frequency resources to which the downlink data channel is transmitted or allocated among the subbands 1712 and 1714 in which the downlink data channel 1750 is transmitted. The contention window adjustment may be applied to a subband (subband #0 of FIG. 17) having the larger number of frequency resources, for example, the larger number of PRBs to which the downlink data channel is transmitted or allocated, among the subbands 1712 and 1714 in which the downlink data channel 1750 is transmitted. The contention window adjustment may be applied to a subband (subband #0 of FIG. 17) having a higher ratio of frequency resources to which the downlink data channel is transmitted or allocated among the subbands 1712 and 1714 in which the downlink data channel 1750 is transmitted. The ratio may be of the data frequency resource region or bandwidth allocated to the subband to the entire frequency resource region or bandwidth. The ratio may be calculated using only the frequency resource region or bandwidth valid for the data channel transmission. The ratio may be of the frequency resource region or bandwidth valid for data channel transmission and the frequency resource region or bandwidth of the entire subband to the data frequency resource region allocated to the subband.

If frequency resources in which the downlink data channel is transmitted or to which the downlink data channel is allocated or ratios thereof in respective subbands are the same as each other, the contention window adjustment may be applied to the subband (subband #0 1712 in FIG. 17) having the smallest subband index among the subbands 1712 and 1714 in which the downlink data channel 1750 is transmitted. The contention window adjustment may be applied to the subband (subband #1 1714 in FIG. 17) having the largest subband index among the subbands 1712 and 1714 in which the downlink data channel 1750 is transmitted. The case of the determination based on the subband index may be applied to cases other than the case in which frequency resources in which the downlink data channel is transmitted or to which the downlink data channel is allocated or ratios thereof in respective subbands are the same as each other.

Method 4-2-2: the result of reception by the terminal of the downlink data channel transmitted through a plurality of subbands is used for each subband in which at least one PRB (or subcarrier) is transmitted.

According to Method 4-2-2, among the downlink data channels, there may be a downlink data channel transmitted through a plurality of subbands such as the downlink data channel 1750. The result of reception by the terminal of the downlink data channel 1750 may be used for each subband in which K or more PRBs (or subcarriers) are transmitted for the downlink data channel 1750, K being 1. For example, K may be a value indicating one PRB or PRBs larger than 1, and K may be predefined or configured through a higher-layer signal. In the subband to which fewer PRBs (or subcarriers) than K are allocated or in which fewer PRBs (or subcarriers) than K are transmitted for the downlink data channel 1750, the result of reception of the downlink data channel 1750 may not be used for adjusting the contention window. If K or more PRBs are allocated to subband #0 1712 and subband #1 1714 for the downlink data channel 1750, the result of reception by the terminal of the downlink data channel 1750 may be used for adjusting the contention window of subband #0 1712 and subband #1 1714. That is, the BS may determine the contention window for subband #0 1712 based on the result of reception by the terminal of the downlink data channels (e.g., 1730 and 1750) transmitted in subband #0 1712 in the reference slot 1720 and determine the contention window for subband #1 1714 based on the result of reception by the terminal of the downlink data channels (e.g., 1740, 1750, and 1760) transmitted in subband #1 1714 in the reference slot 1720.

Method 4-3: adjusts the contention window for each subband and performs the channel access procedure using the largest contention window among the contention windows for each subband.

Method 4-3 adjusts the contention window for each subband similarly as Method 4-2. Among the downlink data channels, there may be a downlink data channel transmitted through a plurality of subbands such as the downlink data channel 1750. The result of reception by the terminal of the downlink data channel 1750 may be used for each of subbands in which K or more PRBs (or subcarriers) are transmitted for the downlink data channel 1750, K being 1. In the subband to which fewer PRBs (or subcarriers) than K are allocated or in which fewer PRBs (or subcarriers) than K are transmitted for the downlink data channel 1750, the result of reception of the downlink data channel 1750 may not be used for adjusting the contention window. If K or more PRBs are transmitted or allocated to each of subband #0 1712 and subband #1 1714 for the downlink data channel 1750, the result of reception by the terminal of the downlink data channel 1750 may be used for adjusting each of the contention windows of subband #0 1712 and subband #1 1714. That is, the BS may determine the contention window for subband #0 1712 based on the result of reception by the terminal of the downlink data channels transmitted in subband #0 1712 in the reference slot 1720 and determine the contention window for subband #1 1714 based on the result of reception by the terminal of the downlink data channels transmitted in subband #1 1714 in the reference slot 1720. Although it is assumed that the contention window is determined using the result of reception by the terminal of all downlink data channels transmitted in the reference slot above, the contention window may be determined using some of the downlink data channels (e.g., reference downlink data channels) transmitted in the reference slot or using all or some of the downlink control channels (e.g., reference downlink control channels), although this is not illustrated in FIG. 17.

Reference Slot Determination Method

In an unlicensed band, the BS may adjust a contention window used for a channel access procedure. The BS may determine the contention window based on results of reception by the terminal of one or more of a downlink control channel and a downlink data channel transmitted in the reference slot.

A method by which the BS determines the reference slot will be described in more detail below, wherein it is assumed that the BS divides a bandwidth or a BWP of a carrier into one or more subbands (subband #0 1712, subband #1 1714, and subband #2 1716) and performs a channel access procedure for each subband. However, this embodiment may also be applied to a channel access procedure being performed in the entirety of the carrier bandwidth or BWP without division into subbands.

The BS may perform the channel access procedure for each subband to transmit a downlink signal in the unlicensed band. For example, as illustrated in FIG. 6, the channel access procedure may be performed to vary the size of the contention window. If it is determined that the unlicensed band is an idle channel, the BS may initiate the channel occupancy as indicated by reference numeral 1700 of FIG. 17. The BS may occupy the channel during an MCOT or a shorter time 1705 according to a channel access priority class used for the channel access procedure. The BS may determine a first slot in the COT 1705 as a reference slot 1720 for adjusting the contention window because the downlink data channel first transmitted after the BS initiates channel access has a high probability of transmission collision with other devices in the unlicensed band channel. The reference slot may additionally include a slot after the starting slot as well as the starting slot.

As illustrated in FIG. 17, the BS may determine the starting slot 1722 of most recent downlink transmission and the next slot 1724 as reference slots for adjusting the contention window. The use of one or more slots as reference slots may be valid when some symbols of the downlink signals (e.g., the downlink signals 1730 and 1740) desired to be transmitted in the starting slot 1722 of the most recent downlink transmission are punctured and transmitted according to the result of the channel access procedure, when the downlink signal up to a symbol right before the symbol that can be occupied after the channel access procedure is punctured and transmitted using the remaining symbols, or when the downlink signal desired to be transmitted in the starting slot 1722 is rate-matched and transmitted using symbols that can be occupied after the channel access procedure. If the downlink signal is punctured or rate-matched and transmitted in the starting slot 1722 of downlink transmission according to the result of the channel access procedure, the probability of the terminal not correctly receiving the downlink data channel in the slot 1722 increases. For example, as the coding rate of the downlink data channel increases in puncturing or rate-matching, the terminal cannot correctly receive the downlink data channel. That is, the probability of NACK increases. Because the NACK is not NACK generated due to a collision with another transmission node, the reference slot 1720 may be determined on the basis of the starting slot 1722 and the next slot 1724. However, even in the above case, only the starting slot 1722 of downlink transmission is determined as the reference slot 1720 in this embodiment. In order to adjust a downlink transmission start time or symbol of the BS according to the result of the channel access procedure or in order to immediately start downlink transmission after the channel access procedure ends, some of the downlink signals transmitted in the starting slot 1722 may be punctured. If at least one reception result among the results of reception by the terminal of one or more downlink data channels among the downlink data channels transmitted in the starting slot 1722 is unrelated to the puncturing even in the above case, the BS may determine only the starting slot 1722 of downlink transmission as the reference slot 1720 for changing the contention window. For example, if the BS receives the reception result for one or more data channels among the downlink data channels transmitted in the starting slot 1722 in units of CBGs, the BS may determine only the downlink transmission starting slot 1722 as the reference slot 1720 for changing the contention window. In the above case, even though the BS punctures some of the downlink signals transmitted in the starting slot 1722 in order to adjust the downlink transmission start time or symbol according to the result of the channel access procedure or in order to immediately start downlink transmission after the channel access procedure ends, the reception result for CBGs transmitted in the time or symbol after the puncturing is unrelated to the puncturing. Accordingly, the BS may determine whether a transmission collision with other devices occurs in the unlicensed band channel based on the reception result for the CBGs transmitted in the starting slot 1722 within the time or symbol after the puncturing and thus determine only the downlink transmission starting slot 1722 as the reference slot 1720 for changing the contention window. The BS, using a scheme such as puncturing in order to immediately start downlink transmission after the channel access procedure ends, may transmit one or more downlink data channels in the starting slot 1722 in which downlink signal transmission starts after the channel access procedure, and when receiving the result of reception by the terminal of one or more downlink data channels among the transmitted downlink data channels in units of CBGs, determine only the downlink transmission starting slot 1722 as the reference slot 1720 for changing the contention window. Otherwise, when the BS receives all the results of reception by the terminal of the downlink data channels transmitted in the reference slot 1722 in units of TBs, the BS may determine the downlink transmission starting slot 1722 and the next slot 1744 as the reference slots 1720 for changing the contention window.

The BS may prepare various downlink data channels according to the expected result of the channel access procedure and transmit the downlink data channel most suitable for the result of the channel access procedure in the downlink transmission starting slot 1722, as illustrated in FIG. 17. For example, the BS may prepare downlink control channels and downlink data channels (e.g., 1770, 1775, 1780, and 1785) that can be transmitted to the terminal according to the result of the channel access procedure in the downlink transmission starting slot 1722, as illustrated in FIG. 17. Although subband #0 1712 and subband #1 1714 are determined to be idle channels based on the result of the channel access procedure performed in each subband, subband #2 1716 may be determined to be occupied by another device. The BS may transmit downlink control channel and downlink data channels 1770, 1775, 1780, and 1785 in the slot 1722. If the channel access procedure ends after first symbols of the downlink data channels 1770 and 1775, i.e., if the BS occupies the unlicensed band and transmits downlink signals after the first symbols of the downlink data channels 1770 and 1775, the BS may transmit the downlink data channels 1770 and 1775 through puncturing and transmit the downlink data channels 1780 and 1785 initiated after the channel access procedure ends.

If the result of reception of the downlink signal transmitted in the starting slot 1722 for initiating downlink transmission is unrelated to the time point at which the channel access procedure ends (e.g., the downlink data channels 1780 and 1785), even the BS performing downlink signal transmission in a symbol after the first symbol of the slot may determine whether a transmission collision with other devices occurs in the unlicensed band channel based on the result of reception by the terminal of the downlink data channel and thus may determine only the downlink transmission starting slot 1722 as the reference slot for changing the contention window. Otherwise, if the result of reception by the terminal of the downlink data channel transmitted in the starting slot 1722 varies depending on the time point at which the channel access procedure ends or starts (if the result of reception by the terminal of the downlink data channel is changed due to puncturing or rate-matching), the BS may determine the downlink transmission starting slot 1722 and the next slot 1724 as reference slots 1720 for changing the contention window. If the BS receives the reception result in units of CBGs from the terminal, the BS may determine only the downlink transmission starting slot 1722 as the reference slot 1720 for changing the contention window, as described above.

Although the method above describes determining the reference slot, the disclosure can determine the contention window based on the result of reception by the terminal of all or some of the downlink data channels transmitted in the reference slot.

As described above, an apparatus and a method according to an embodiment of the disclosure can adjust a contention window for a channel access procedure in an unlicensed band, so that a base station and a terminal can more effectively perform communication.

In accordance with an embodiment of the disclosure, a method is provided for determining a contention window for performing a channel access procedure of a BS in an unlicensed band of a wireless communication system. Various types of downlink transmission signals are used for adjusting a contention window, and thus the BS may more efficiently perform the channel access procedure in consideration of a collision with another node to occupy the unlicensed band.

A reference slot, which is an interval determined in consideration of an HARQ-ACK value, is defined to adjust the size of the contention window. The reference slot includes downlink transmission for carrying at least one of a downlink control channel or a downlink data channel and may be a unit of a radio frame. The slot may be a concept distinguished from a slot interval (e.g., 9 us) for determining channel occupancy by another node, such as CCA of LBT.

The expression "larger (or greater) than or equal to" or "smaller (or less) than or equal to" is used to determine whether a specific condition is satisfied or fulfilled, but is only to indicate an example, and does not exclude "larger than" or "smaller than". A condition indicating "larger than or equal to" may be replaced with "larger than", a condition indicating "equal to or smaller than" may be replaced with "smaller than", and a condition indicating "larger than or equal to and smaller than" may be replaced with "larger than and smaller than".

Methods disclosed in the claims and/or methods according to embodiments described herein may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), WLAN, and storage area network (SAN) or a combination thereof. Such a storage device may access the electronic device via an external port. Further, a separate storage device on the communication network may access a portable electronic device.

In the above-described embodiments, an element may be expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. As will be apparent to those skilled in the art, other modifications and changes may be made thereto based on the technical spirit of the disclosure.

Further, the above respective embodiments may be employed in combination. For example, the embodiments of the disclosure may be partially combined to operate a base station and a terminal.

A method in the disclosure may be partially combined to operate a base station and a terminal. Further, although the above embodiments have been described by way of 5G and NR systems, other variants based on the technical idea of the embodiments may be implemented in other systems such as LTE, LTE-A, and LTE-A-Pro systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for multiple sub-bands access by a base station (BS) in a wireless communication system, the method comprising:
    identifying at least one hybrid automatic repeat request-acknowledgement (HARQ-ACK) feedback corresponding to at least one physical downlink shared channel (PDSCH) in a reference duration for a downlink channel occupancy, wherein the at least one PDSCH in the reference duration includes a PDSCH that partially but not fully overlaps with a sub-band among multiple sub-bands;
    determining a contention window for the sub-band among the multiple sub-bands, based on the at least one HARQ-ACK feedback including a HARQ-ACK feedback corresponding to the PDSCH that partially but not fully overlaps with the sub-band among the multiple sub-bands;
    identifying a number within the contention window for the sub-band;
    sensing the sub-band based on the number and a defer duration; and
    performing a downlink transmission on the sub-band, in case that the sub-band is sensed to be idle,
    wherein the reference duration includes a first slot corresponding to transmission of the at least one PDSCH within the downlink channel occupancy.

2. The method of claim 1, wherein the PDSCH that partially but not fully overlaps with the sub-band is transmitted across the multiple sub-bands, and
    wherein the at least one PDSCH further includes a PDSCH that fully overlaps with the sub-band among the multiple sub-bands.

3. The method of claim 1, wherein an initial value of the contention window for the sub-band is identified as a minimum value.

4. The method of claim 1, wherein the downlink channel occupancy is a latest downlink channel occupancy.

5. The method of claim 1, wherein the reference duration depends on a subcarrier spacing.

6. The method of claim 1, in case that the at least one HARQ-ACK feedback is a code block group based feedback for the at least one PDSCH, the contention window is adjusted based on a ratio of ACK or NACK for code block groups of the at least one PDSCH.

7. The method of claim 1, wherein the multiple sub-bands are within a bandwidth of a carrier.

8. The method of claim 1, wherein the reference duration is defined as a duration from a beginning of the downlink channel occupancy until an end of the first slot corresponding to transmission of the at least one PDSCH.

9. A method for multiple sub-bands access by a terminal in a wireless communication system, the method comprising:
    transmitting, to a base station (BS), at least one hybrid automatic repeat request-acknowledgement (HARQ-ACK) feedback corresponding to at least one physical downlink shared channel (PDSCH) in a reference duration for a downlink channel occupancy, wherein the at least one PDSCH in the reference duration includes a PDSCH that partially but not fully overlaps with a sub-band among multiple sub-bands; and
    receiving, from the BS, a downlink signal on the sub-band, in case that the sub-band is idle,
    wherein the at least one HARQ-ACK feedback including a HARQ-ACK feedback corresponding to the PDSCH that partially but not fully overlaps with the sub-band among the multiple sub-bands is used for determination of a contention window for the sub-band among the multiple sub-bands,
    wherein whether the sub-band is idle is based on a defer duration and a number identified within the contention window for the sub-band, and
    wherein the reference duration includes a first slot corresponding to transmission of the at least one PDSCH within the downlink channel occupancy.

10. The method of claim 9, wherein the PDSCH that partially but not fully overlaps with the sub-band is received across the multiple sub-bands, and
    wherein the at least one PDSCH further includes a PDSCH that fully overlaps with the sub-band among the multiple sub-bands.

11. The method of claim 9, wherein an initial value of the contention window for the sub-band is identified as a minimum value.

12. The method of claim 9, wherein the downlink channel occupancy is a latest downlink channel occupancy.

13. A base station (BS), comprising:

a transceiver; and a controller configured to:

identify at least one hybrid automatic repeat request-acknowledgement (HARQ-ACK) feedback corresponding to at least one physical downlink shared channel (PDSCH) in a reference duration for a downlink channel occupancy, wherein the at least one PDSCH in the reference duration includes a PDSCH that partially but not fully overlaps with a sub-band among multiple sub-bands, determine a contention window for the sub-band among the multiple sub-bands based on the at least one HARQ-ACK feedback including a HARQ-ACK feedback corresponding to the PDSCH that partially but not fully overlaps with the sub-band among the multiple sub-bands, identify a number within the contention window for the sub-band, sense the sub-band based on the number and a defer duration, and perform a downlink transmission on the sub-band, in case that the sub-band is sensed to be idle, wherein the reference duration includes a first slot corresponding to transmission of the at least one PDSCH within the downlink channel occupancy.

14. The BS of claim 13, wherein the PDSCH that partially but not fully overlaps with the sub-band is transmitted across the multiple sub-bands, and wherein the at least one PDSCH further includes a PDSCH that fully overlaps with the sub-band among the multiple sub-bands.

15. The BS of claim 13, wherein an initial value of the contention window for the sub-band is identified as a minimum value.

16. The BS of claim 13, wherein the downlink channel occupancy is a latest downlink channel occupancy.

17. A terminal, comprising:

a transceiver; and a controller configured to:

transmit, to a base station (BS), at least one hybrid automatic repeat request-acknowledgement (HARQ-ACK) feedback corresponding to at least one physical downlink shared channel (PDSCH) in a reference duration for a downlink channel occupancy wherein the at least one PDSCH in the reference duration includes a PDSCH that partially but not fully overlaps with a sub-band among multiple sub-bands, and receive, from the BS, a downlink signal on the sub-band, in case that the sub-band is idle, wherein the at least one HARQ-ACK feedback including a HARQ-ACK feedback corresponding to the PDSCH that partially but not fully overlaps with the sub-band among the multiple sub-bands is used for determination of a contention window for the sub-band among the multiple sub-bands, wherein whether the sub-band is idle is based on a defer duration and a number identified within the contention window for the sub-band, and wherein the reference duration includes a first slot corresponding to transmission of the at least one PDSCH within the downlink channel occupancy.

18. The terminal of claim 17, wherein the PDSCH that partially but not fully overlaps with the sub-band is received across the multiple sub-bands, and wherein the at least one PDSCH further includes a PDSCH that fully overlaps with the sub-band among the multiple sub-bands.

19. The terminal of claim 17, wherein an initial value of the contention window for the sub-band is identified as a minimum value.

20. The terminal of claim 17, wherein the downlink channel occupancy is a latest downlink channel occupancy.

* * * * *